US010669159B2

(12) United States Patent
Akimoto et al.

(10) Patent No.: US 10,669,159 B2
(45) Date of Patent: Jun. 2, 2020

(54) PROTON-CONDUCTIVE COMPLEX OXIDE AND FUEL CELL USING SAME AS ELECTROLYTE

(71) Applicant: NATIONAL INSTITUTE OF ADVANCED INDUSTRIAL SCIENCE AND TECHNOLOGY, Tokyo (JP)

(72) Inventors: Junji Akimoto, Tsukuba (JP); Naoki Hamao, Tsukuba (JP); Kunimitsu Kataoka, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 15/753,910

(22) PCT Filed: Aug. 19, 2016

(86) PCT No.: PCT/JP2016/074243
§ 371 (c)(1),
(2) Date: Feb. 20, 2018

(87) PCT Pub. No.: WO2017/033862
PCT Pub. Date: Mar. 2, 2017

(65) Prior Publication Data
US 2018/0282174 A1 Oct. 4, 2018

(30) Foreign Application Priority Data

Aug. 21, 2015 (JP) ................................ 2015-164093

(51) Int. Cl.
C01G 25/00 (2006.01)
H01B 1/08 (2006.01)
(Continued)

(52) U.S. Cl.
CPC ............ *C01G 25/006* (2013.01); *C01F 17/32* (2020.01); *C01G 27/006* (2013.01); *H01B 1/08* (2013.01);
(Continued)

(58) Field of Classification Search
CPC ..... C01G 25/006; C01F 17/0018; H01B 1/08; H01B 13/00; H01M 4/88; H01M 8/02; H01M 8/12
See application file for complete search history.

(56) References Cited

U.S. PATENT DOCUMENTS

2016/0149260 A1* 5/2016 Badding ............... H01M 4/382
429/405

FOREIGN PATENT DOCUMENTS

JP 2012-096940 A 5/2012

OTHER PUBLICATIONS

Ma et al (Excellent Stability of a Lithium-Ion-Conducting Solid Electrolyte upon Reversible Li+/H+ Exchange in Aqueous Solutions, Angew. Chem. Int. Ed. (2015), 54, 129-133 (Year: 2014).*
(Continued)

Primary Examiner — Melvin C. Mayes
Assistant Examiner — Michael Forrest
(74) Attorney, Agent, or Firm — Studebaker & Brackett PC

(57) ABSTRACT

Provided is a complex oxide that has a high hydrogen content, contains almost no impurity phase, and is suitable for proton conductivity. The complex oxide is represented by a chemical formula $Li_{7-x}H_xLa_3M_2O_{12}$ (M represents Zr and/or Hf, and $3.2 < x \leq 7$) and is a single phase of a garnet type structure belonging to a cubic system. A method for producing the complex oxide includes an exchange step of bringing a raw material complex oxide represented by a chemical formula $Li_{7-x}H_xLa_3M_2O_{12}$ (M represents Zr and/or
(Continued)

Hf, and 0≤x≤3.2) and a compound having a hydroxy group or a carboxyl group into contact with each other to exchange at least some of lithium of the raw material complex oxide and hydrogen of the compound having a hydroxy group or a carboxyl group.

10 Claims, 13 Drawing Sheets

(51) Int. Cl.

| | | |
|---|---|---|
| *H01B 13/00* | (2006.01) | |
| *H01M 8/12* | (2016.01) | |
| *H01M 4/88* | (2006.01) | |
| *H01M 8/02* | (2016.01) | |
| *C01F 17/00* | (2020.01) | |
| *C01G 27/00* | (2006.01) | |
| *H01M 8/1016* | (2016.01) | |
| *C01F 17/32* | (2020.01) | |

(52) U.S. Cl.
CPC ............. *H01B 13/00* (2013.01); *H01M 4/88* (2013.01); *H01M 8/02* (2013.01); *H01M 8/1016* (2013.01); *H01M 8/12* (2013.01); *C01P 2002/72* (2013.01); *C01P 2002/76* (2013.01); *C01P 2002/77* (2013.01); *C01P 2002/88* (2013.01); *C01P 2002/90* (2013.01); *C01P 2004/38* (2013.01); *C01P 2006/40* (2013.01); *H01M 2300/0071* (2013.01); *Y02E 60/525* (2013.01); *Y02P 70/56* (2015.11)

(56) References Cited

OTHER PUBLICATIONS

International Search Report issued in PCT/JP2016/074243; dated Sep. 20, 2016.
International Preliminary Report on Patentability and Written Opinion issued in PCT/JP2016/074243; dated Feb. 27, 2018.
Cai Liu et al.; "Reversible Ion Exchange and Structural Stability of Garnet-Type Nb-Doped $Li_7La_3Zr_2O_{12}$ in Water for Applications in Lithium Batteries"; Journal of Power Sources; Feb. 9, 2015; pp. 286-293; vol. 282.
Yutao Li et al.; "The Reaction of $Li_{6.5}La_3Zr_{1.5}Ta_{0.5}O_{12}$ with Water"; Solid State Ionics; Nov. 28, 2014; pp. 57-61; vol. 269; Elsevier B.V.
G. Larraz et al.; "NMR Study of Li Distribution in $Li_{7-x}H_xLa_3Zr_2O_{12}$ Garnets"; Journal of Materials Chemistry A; Mar. 14, 2015; pp. 5683-5691 (particularly, p. 5684, right column, lines 15 to 35, p. 5685, left column, line 44 to p. 5686, left column, line 44); vol. 3, No. 10; The Royal Society of Chemistry.
Alodia Orera et al.; "Influence of $Li^+$ and $H^+$ Distribution on the Crystal Structure of $Li_{7-x}H_xLa_3Zr_2O_{12}$ (0 ≤ x ≤5) Garnets"; Inorganic Chemistry; Jan. 12, 2016; pp. 1324-1332 (particularly, p. 1325, left column, line 41 to p. 1328, left column, line 33); vol. 55; American Chemical Society.
G. Larraz, A. Orera and M. L. Sanjuan, "Cubic phases of garnet-type $Li_7La_3Zr_2O_{12}$: the role of hydration", Journal of Materials Chemistry A, Jul. 23, 2013, pp. 11419-11428, The Royal Society of Chemistry.
Lina Truong, Matthew Howard, Oliver Clemens, et.al., "Facile proton conduction in $H^+/Li^+$ ion-exchanged garnet-type fast Li-ion conducting $Li_5La_3Nb_2O_{12}$", Journal of Materials Chemistry A, Oct. 4, 2013, pp. 13469-13475, The Royal Society of Chemistry.
L. Dhivya, "Influence of Dopants on Structure, Microstructure and $Li^+$ Transport Properties of $Li_7La_3Zr_2O_{12}$ Lithium Garnet", Department of Physics, School of Physical, Chemical and Applied Sciences, Pondicherry University, Jun. 22, 2015, Puducherry, India.

\* cited by examiner

PROTON-CONDUCTIVE COMPLEX OXIDE AND FUEL CELL USING SAME AS ELECTROLYTE

TECHNICAL FIELD

The present invention relates to a complex oxide having high proton conductivity and a fuel cell using the complex oxide as an electrolyte.

BACKGROUND ART

As a proton-conductive complex oxide for use in a fuel cell, $Li_{1.7}H_{5.05}La_3Nb_{0.25}Zr_{1.75}O_{12}$ has been known (Non-Patent Document 1). $Li_{1.7}H_{5.05}La_3Nb_{0.25}Zr_{1.75}O_{12}$ is prepared by washing $Li_{6.75}La_3Nb_{0.25}Zr_{1.75}O_{12}$ having good lithium conductivity with water, subjecting the complex oxide to vacuum drying, and repeatedly subjecting the complex oxide to an annealing treatment at 150° C.

However, regarding the crystal structure of $Li_{1.7}H_{5.05}La_3Nb_{0.25}Zr_{1.75}O_{12}$, only the lattice constant has been reported and a correlation between a hydrogen amount and proton conductivity has not been clarified. In addition, Non-Patent Document 2 discloses that lithium can be substituted by hydrogen by washing $Li_{6.75}La_3Ta_{0.25}Zr_{1.75}O_{12}$ with water at room temperature. However, the amount of substitution to hydrogen is as small as 21% of the amount of lithium.

CITATION LIST

Non-Patent Document

Non-Patent Document 1: C. Liu, K. Rui, C. Shen, M. E. Badding, G. Zhang, Z. Wen, Journal of Power Sources, 282 (2015) p. 286-293

Non-Patent Document 2: Y. Li, J.-T. Han, S. V. Vogel, C.-A. Wang, Solid State Ionics, 269 (2015) p. 57-61

SUMMARY

Technical Problem

The present invention is made in consideration of such circumstances and an object thereof is to provide a complex oxide having high proton conductivity.

Solution to Problem

The present inventors have found that a proton-conductive complex oxide can be obtained by subjecting a garnet type lithium ion conductor oxide to a proton exchange treatment in alcohol at 80° C. or higher. This proton-conductive complex oxide is represented by a chemical formula $Li_{7-x}H_xLa_3M_2O_{12}$ (M represents Zr and/or Hf, and $3.2 < x \leq 7$), has a garnet type structure, has no precipitation of lanthanum hydroxide as an impurity phase, and adopts I-43d which is a space group suitable for proton conduction or the like. It has been confirmed that a fuel cell system using the proton-conductive complex oxide as an electrolyte material can generate electric power and thus the present invention has been completed.

A complex oxide of the present invention is represented by a chemical formula $Li_{7-x}H_xLa_3M_2O_{12}$ (M represents Zr and/or Hf, and $3.2 < x \leq 7$) and is a single phase of a garnet type structure belonging to a cubic system. A proton conductor of the present invention contains the complex oxide of the present invention. A fuel cell of the present invention includes a fuel electrode, an air electrode, and a solid electrolyte containing the proton conductor of the present invention.

A method for producing a complex oxide of the present invention is a method for producing a complex oxide which is represented by a chemical formula $Li_{7-x}H_xLa_3M_2O_{12}$ (M represents Zr and/or Hf, and $3.2 < x \leq 7$) and is a single phase of a garnet type structure belonging to a cubic system, the method including an exchange step of bringing a raw material complex oxide represented by a chemical formula $Li_{7-x}H_xLa_3M_2O_{12}$ (M represents Zr and/or Hf, and $0 \leq x \leq 3.2$) and a compound having a hydroxy group or a carboxyl group into contact with each other to exchange at least some of lithium of the raw material complex oxide and hydrogen of the compound having a hydroxy group or a carboxyl group.

Advantageous Effects of Invention

According to the present invention, it is possible to obtain a complex oxide that is useful as a proton conductor.

DESCRIPTION OF EMBODIMENTS

Figure 1:
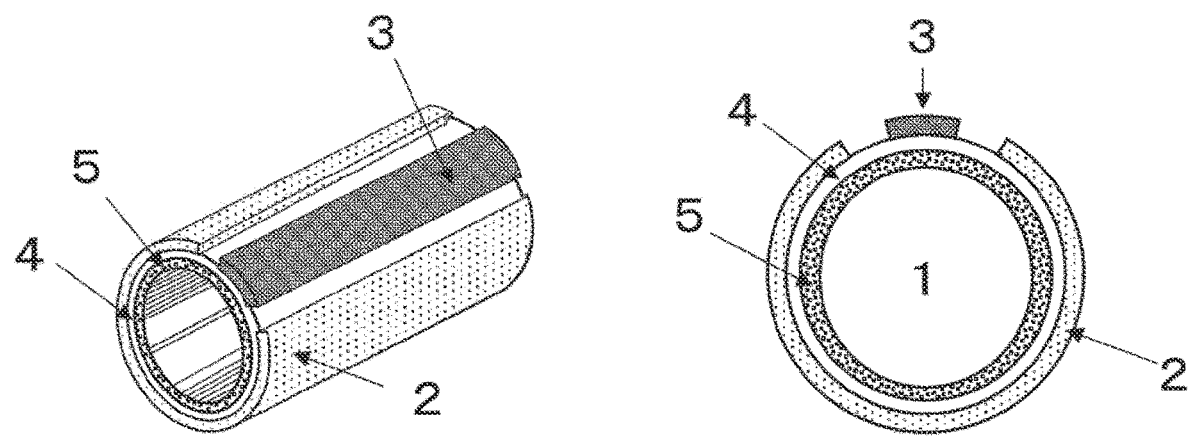
FIG. 1 is a schematic view showing an example of a fuel cell.

The present inventors have conducted intensive investigations on a production method for increasing a hydrogen content in a proton conductor having a garnet type structure by further advancing a proton exchange reaction, and a space group of a crystal structure of a cubic system exhibiting good proton conductivity. As a result thereof, it has been found that a complex oxide $Li_{7-x}H_xLa_3M_2O_{12}$ (M represents Zr and/or Hf, and $3.2<x\le7$) having a garnet type structure can be prepared and electric power can be generated by an intermediate temperature operation type fuel cell system using the complex oxide as an electrolyte.

Particularly, the cubic system space group becomes I-43d by optimizing the crystal structure and lithium does not occupy the proton conduction path of the crystal structure. Thus, a crystal structure suitable for proton conduction is obtained. Here, the space group being I-43d can be confirmed by observing peaks with indexes 310, 530, 710, 730, and the like in powder X-ray diffraction measurement. That is, in a case where the space group is Ia-3d, these peaks are not observed in principle from the extinction rule. In addition, in a known synthesizing method, while there is a disadvantage of precipitation of lanthanum hydroxide causing a problem at the time of using the complex oxide as an electrolyte material, a proton conductor of a single phase can be produced by using an alcohol-based solvent. Even in a case where the complex oxide has a space group Ia-3d, as long as the hydrogen content is high, the complex oxide is suitable for proton conduction.

Hereinafter, a complex oxide, a proton conductor, a fuel cell, and a method for producing a complex oxide of the present invention will be described based on embodiments and examples. It is to be noted that the overlapping description will be omitted as appropriate. In addition, in a case where the term "o" is used between two numerical values to represent a numerical range, these two numerical values are also included in the numerical range.

A complex oxide according to a first embodiment of the present invention is represented by a chemical formula $Li_{7-x}H_xLa_3M_2O_{12}$ (M represents Zr and/or Hf, and $3.2<x\le6.6$) and is a single phase of a garnet type structure belonging to a cubic system. In the complex oxide of the first embodiment, a cubic system lattice constant a satisfies 13.07 Å<a<13.11 Å. The crystal structure of the complex oxide of the first embodiment is a space group I-43d.

A complex oxide according to a second embodiment of the present invention is represented by a chemical formula $Li_{7-x}H_xLa_3M_2O_{12}$ (M represents Zr and/or Hf, and $6.6<x\le7$) and is a single phase of a garnet type structure belonging to a cubic system. In the complex oxide of the second embodiment, a cubic system lattice constant a satisfies 13.07 Å<a<13.11 Å. The crystal structure of the complex oxide of the second embodiment is a space group Ia-3d.

A proton conductor according to an embodiment of the present invention contains the complex oxide of each embodiment. A fuel cell according to an embodiment of the present invention includes a fuel electrode, an air electrode, and a solid electrolyte containing the proton conductor of the embodiment. A method for producing a complex oxide according to an embodiment of the present invention is a method for producing a complex oxide that is represented by a chemical formula $Li_{7-x}H_xLa_3M_2O_{12}$ (M represents Zr and/or Hf, $3.2<x\le7$) and is a single phase of a garnet type structure belonging to a cubic system. The method for producing a complex oxide of the embodiment includes an exchange step of bringing a raw material complex oxide represented by a chemical formula $Li_{7-x}H_xLa_3M_2O_{12}$ (M represents Zr and/or Hf, $0\le x\le3.2$) and a compound having a hydroxy group or a carboxyl group to exchange at least some of lithium of the raw material complex oxide and hydrogen of the compound having a hydroxy group or a carboxyl group. Here, water is not included in the compound having a hydroxy group.

In a case where the exchange step is carried out using alcohol at an exchange temperature of 80° C. to 180° C., a complex oxide $Li_{7-x}H_xLa_3M_2O_{12}$ (M represents Zr and/or Hf, and $3.2<x\le6.6$) whose crystal structure is a space group I-43d is obtained. In addition, in a case where the exchange step is carried out using an acidic aqueous solution at an exchange temperature of 200° C. to 220° C., a complex oxide $Li_{7-x}H_xLa_3M_2O_{12}$ (M represents Zr and/or Hf, and $6.6<x\le7$) whose crystal structure is a space group Ia-3d is obtained.

The raw material complex oxide can be produced by weighing and mixing a lithium raw material, a lanthanum raw material, a zirconium raw material, and/or a hafnium raw material such that the chemical composition is represented by a chemical formula $Li_{7-x}H_xLa_3M_2O_{12}$ (M represents Zr and/or Hf, and $0\le x\le3.2$), and heating the mixture in an atmosphere in which an oxygen gas is present, such as in air. The lithium raw material is at least one of metal lithium and a lithium compound. The lanthanum raw material is at least one of metal lanthanum and a lanthanum compound. The zirconium raw material is at least one of metal zirconium and a zirconium compound. The hafnium raw material is at least one of metal hafnium and a hafnium compound.

$Li_7La_3M_2O_{12}$ (M represents Zr and/or Hf) may be synthesized by weighing and mixing compounds including two or more of lithium, lanthanum, zirconium, and hafnium such that the chemical composition is $Li_7La_3M_2O_{12}$ (M represents Zr and/or Hf) and heating the mixture in an atmosphere in which an oxygen gas is present, such as in air. The lithium compound is not particularly limited as long as the compound contains lithium. Examples thereof include $Li_2CO_3$, $LiOH \cdot H_2O$, $LiNO_3$, $LiCl$, $Li_2SO_4$, $Li_2O$, and $Li_2O_2$. Further, lithium lanthanum oxides such as $LiLaO_2$, lithium zirconium oxides such as $Li_2ZrO_3$, and the like may be exemplified. Among these, a lithium carbonate $Li_2CO_3$ or the like is preferable.

The lanthanum compound is not particularly limited as long as the compound contains lanthanum. Examples thereof include $La_2O_3$, $La_2(CO_3)_3$, and $La(NO_3)_3 \cdot H_2O$. Among these, a lanthanum oxide $La_2O_3$ or the like is preferable. The zirconium compound is not particularly limited as long as the compound contains zirconium. Examples thereof include $ZrCl_4$ and $ZrO_2$. Further, $La_2Zr_2O_7$ which is a lanthanum zirconium compound, or the like may be exemplified.

A specific method for producing the raw material complex oxide is as follows. First, a mixture including a lithium raw material, a lanthanum raw material, and a zirconium raw material and/or a hafnium raw material is prepared. Each raw material is preferably mixed at such a ratio that the chemical composition is represented by a chemical formula $Li_{7-x}H_xLa_3M_2O_{12}$ (M represents Zr and/or Hf, and $0 \leq x \leq 3.2$). In addition, the mixing method is not particularly limited as long as each raw material can be uniformly mixed, and for example, the raw materials may be mixed in a wet or dry method using a known mixing machine such as a mixer.

Next, the mixture is put into a firing vessel and fired. In a case of using an alumina firing vessel, aluminum is mixed in the mixture and thus this case is not preferable. Accordingly, for the purpose of obtaining a good proton conductor, a non-alumina-based ceramic firing vessel or the like is preferably used and an yttrium stabilized zirconia (YSZ) firing vessel or the like is preferably used. The firing temperature can be appropriately set according to the raw material and the highest temperature is preferably 900° C. to 1200° C. and more preferably 950° C. to 1150° C. In addition, the firing atmosphere is not particularly limited, and firing may be typically carried out in an oxidizing atmosphere or in air.

In addition, in a case in which the time for firing at a high temperature is long or in a case where the number of times of firing is large, lithium volatilizes at a high temperature and thus the amount of lithium in the chemical composition is reduced. In such a case, it is preferable to use a mixture in which the amount of lithium has been excessively set to 30 mol % or less in advance compared to the desired compositional ratio of $Li_{7-x}H_xLa_3M_2O_{12}$ (M represents Zr and/or Hf, $0 \leq x \leq 3.2$). The firing time can be appropriately changed according to the firing temperature or the like. A cooling method is not particularly limited and typically, natural cooling (cooling in the furnace) or slow cooling may be used. After firing, if necessary, the fired material is pulverized by a known method and while changing the highest temperature, firing may be further carried out again one or two times. The degree of pulverization may be appropriately controlled according to the firing temperature or the like.

Through the exchange step of bringing the raw material complex oxide of $Li_{7-x}H_xLa_3M_2O_{12}$ (M represents Zr and/or Hf, $0 \leq x \leq 3.2$) thus obtained and the compound having a hydroxy group or a carboxyl group into contact with each other to exchange at least some of lithium of the raw material complex oxide and hydrogen of the compound having a hydroxy group or a carboxyl group, a complex oxide represented by a chemical formula $Li_{7-x}H_xLa_3M_2O_{12}$ (M represents Zr and/or Hf, and $3.2 < x \leq 7$) is obtained. According to the production method, precipitation of lanthanum hydroxide which is a byproduct can be suppressed and a garnet type proton conductor as a single phase can be prepared. In addition, a hydrogen exchange reaction is reliably advanced and thus the hydrogen content can be maximized.

It is preferable that the compound having a hydroxy group or a carboxyl group is contained in an acidic aqueous solution, or that the compound having a hydroxy group or a carboxyl group is alcohol. The alcohol is preferably a primary alcohol. For example, methanol, ethanol, 1-propanol, 1-butanol, 1-hexanol, 1-heptanol, and the like may be used. Among these, methanol or ethanol having a low boiling point is particularly preferable. The compound having a carboxy group is not particularly limited and as long as the compound is an organic acid compound having a carboxy group. Preferable is carboxylic acid and examples thereof include benzoic acid, phthalic acid, acetic acid, and formic acid.

The temperature in the exchange step (hereinafter, referred to as "exchange temperature" in some cases) can be set from the viewpoint of the boiling point of an aqueous compound or non-aqueous compound having a hydroxy group or a carboxyl group to be used and the ion exchange rate. The exchange temperature is preferably, for example, 80° C. or higher, more preferably 100° C. or higher, and even more preferably 120° C. or higher. The exchange temperature is desirably 220° C. or lower from the viewpoint of suppressing volatilization of the solvent as much as possible. The reaction time in the exchange step (hereinafter, referred to as "exchange time" or "holding time" in some cases) can be appropriately changed according to the kind and amount of aqueous compound or non-aqueous compound having a hydroxy group or a carboxyl group to be used. The exchange time is preferably 12 hours or longer and more preferably 100 hours or longer to further advance the exchange reaction.

A method for maintaining the exchange temperature (hereinafter, referred to as a "heating method" in some cases) is not particularly limited as long as the method is a method for carrying out heating while suppressing volatilization of the solvent of the aqueous compound or non-aqueous compound. As the heating method, for example, heating using a circulating tube provided with a cooling device or continuous heating capable of handling an exchange step in an airtight vessel or an exchange step in a supercritical state, or the like is preferable. As the heating method, a method for heating a beaker made of PTFE in an autoclave made of SUS or the like is more preferable. After heating, the temperature is decreased to room temperature and then the material is sufficiently washed with the solvent used for reaction and followed by washing with water or ethanol. The material is finally sufficiently dried at about 60° C. to obtain a complex oxide. At this time, in order to remove extra lithium, a step for washing with water may be further added.

In the fuel cell according to the embodiment of the present invention, $Li_{7-x}H_xLa_3M_2O_{12}$ (M represents Zr and/or Hf, and $3.2 < x \leq 7$) is used as an electrolyte material. Except that the complex oxide of the embodiment is used as a solid electrolyte ceramic material, a cell element of a known intermediate temperature operation type fuel cell (of plate type, cylindrical type, cylindrical plate type, or the like) can be adopted as it is. Examples of the intermediate temperature operation type fuel cell include a solid polymer fuel cell, a phosphoric acid fuel cell, a molten salt fuel cell, a solid oxide fuel cell, an alkali electrolyte fuel cell, a direct fuel cell, a bio fuel cell, and the like.

FIG. 1 shows a fuel cell 1 in which the fuel cell according to the embodiment of the present invention is applied to a cylindrical type solid oxide fuel cell. The fuel cell 1 includes a fuel electrode 2, an interconnector 3, a solid electrolyte 4, and an air electrode 5. For the fuel electrode 2, the interconnector 3, and the air electrode 5, members constituting a known plate type, cylindrical type, or cylindrical plate type solid oxide fuel cell can be adopted as they are. The solid electrolyte 4 includes a proton conductor containing the complex oxide $Li_{7-x}H_xLa_3M_2O_{12}$ (M represents Zr and/or Hf, and $3.2 < x \leq 7$) of the embodiment.

The complex oxide of the embodiment is produced in the form of powder. Therefore, in order to use the complex oxide of the embodiment for the solid electrolyte, a press molding technique, a coating technique, a film formation technique, or the like is applied to obtain a molded body. Examples of the press molding technique include a sintering molding method, a pressure molding method, and an electric pressure sintering method. Examples of the coating technique include a screen printing method, an electrophoresis (EPD) method, a doctor blade method, a spray coating method, an ink jet method, and a spin coating method. Examples of the film formation technique include a vapor deposition method, a sputtering method, a chemical vapor deposition (CVD) method, an electrochemical vapor phase growth method, an ion beam method, a laser ablation method, an atmospheric pressure plasma film formation method, a reduced pressure plasma film formation method, and a composite film formation method.

As the material for the fuel electrode, a mixture of a metal catalyst and a ceramic powder material formed of a proton conductor can be used. As the metal catalyst, noble metals stable in a reducing atmosphere and having hydrogen oxidation activity, such as nickel, iron, cobalt, platinum, ruthenium, or palladium can be used. In addition, as the proton conductor, the complex oxide of the embodiment can be used but in addition to the complex oxide, $Ba(Zr,Y)O_3$, $Sr(Zr,Y)O_3$, $Ba(Ce,Y)O_3$, a phosphate-based proton-conductive oxide, and the like can be used. The mixed state of the metal catalyst and the ceramic powder material formed of the proton conductor may be a physically mixed state or may be powder modification to the metal catalyst or metal catalyst modification to the ceramic material.

As the material for the air electrode, a known powder ceramic material as the material for an air electrode of a solid oxide fuel cell can be used. For example, metal oxides of Co, Fe, Ni, Cr, and Mn having a perovskite structure or the like can be used. Specifically, oxides such as $(Sm,Sr)CoO_3$, $(La,Sr)MnO_3$, $(La,Sr)CoO_3$, $(La,Sr)(Fe,Co)O_3$, and $(La,Sr)(Fe,Co,Ni)O_3$ may be used. Among these, $(La,Sr)(Fe,Co)O_3$ is preferable. These ceramic materials may be used alone or as a mixture of two or more thereof.

EXAMPLES

In the following examples, the features of the present invention will be further clarified. The present invention is not limited to the examples.

Example 1

(Synthesis of Complex Oxide $Li_{7-x}H_xLa_3Zr_2O_{12}$ ($3.2 < x \leq 6.6$))

1 g of a raw material complex oxide $Li_7La_3Zr_2O_{12}$ (manufactured by Kojundo Chemical Lab. Co., Ltd.) powder and 20 mL of anhydrous ethanol (guaranteed grade reagent, manufactured by Wako Pure Chemical Industries, Ltd.) were put into a PTFE beaker having an internal volume of 100 mL, and the beaker was set in a SUS pressure resistant vessel. The SUS pressure resistant vessel was put into a dryer and held at a highest temperature of 120° C. for 10 hours, 24 hours, 48 hours, 120 hours, and 240 hours. Thereafter, cooling was carried out, the resultant was washed with ethanol, and then only the powder sample was taken out. Then, the powder was dried in air at 60° C. to collect the powder samples of each complex oxide.

Figure 2:
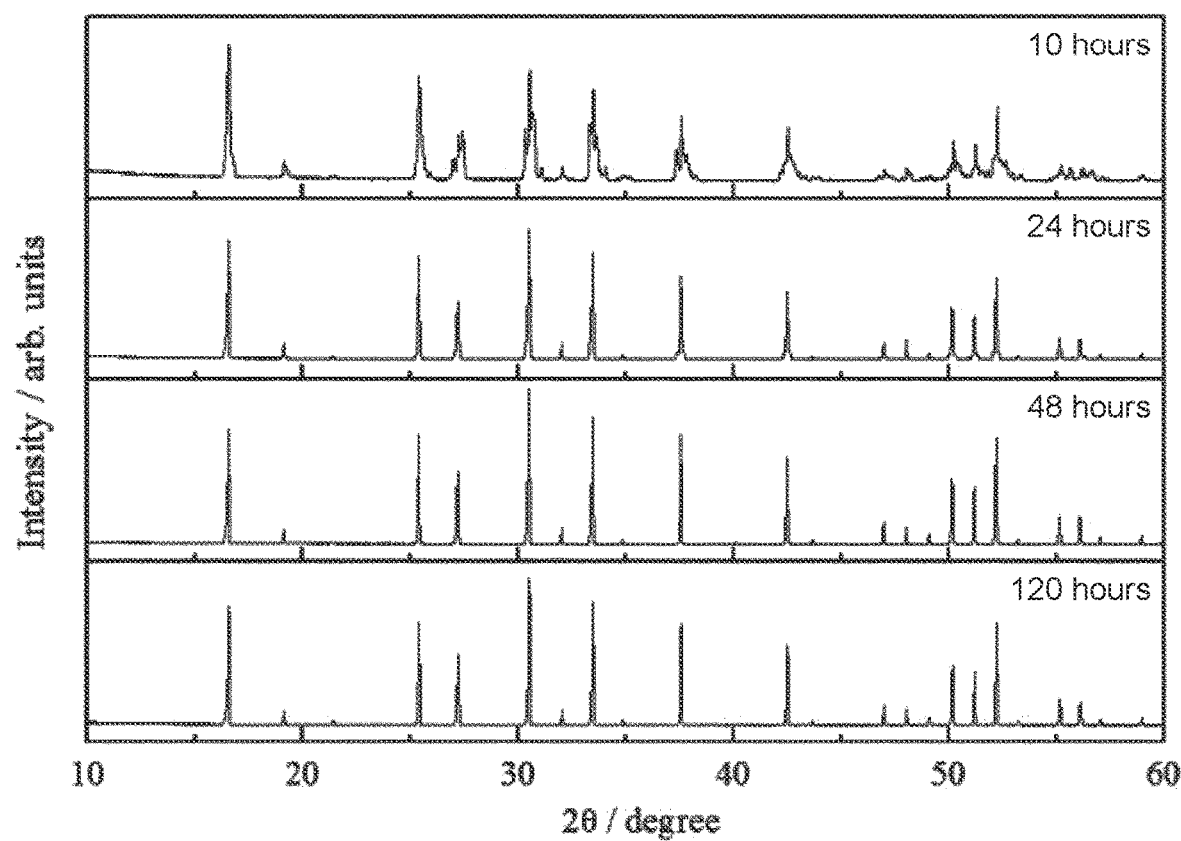
FIG. 2 is a powder X-ray diffraction chart of a complex oxide $Li_{7-x}H_xLa_3Zr_2O_{12}$ ($3.2 < x \leq 6.6$) obtained in Example 1.

The crystal structure of each of the complex oxides obtained was investigated by a powder X-ray diffraction device (trade name: SmartLab, manufactured by Rigaku Corporation). It was confirmed that the complex oxides at each holding time of 24 hours, 48 hours, 120 hours, and 240 hours had good crystallinity and was a single phase of a garnet type structure belonging to a cubic system. On the other hand, the complex oxide at a holding time of 10 hours had a peak derived from the tetragonal crystal of a raw material complex oxide at a skirt position of the peak of the cubic crystal. The powder X-ray diffraction chart of each complex oxide at each holding time of 10 hours, 24 hours, 48 hours, and 120 hours are shown in FIG. 2.

In addition, as a result of carrying out refinement of the lattice constant a of a cubic system which is the average structure by the least squares method with respect to each complex oxide at each holding time of 24 hours, 48 hours, 120 hours, and 240 hours, the values shown in Table 1 below were obtained. It was confirmed that each complex oxide at each holding time of 24 hours, 48 hours, 120 hours, and 240 hours obtained in the example holds a garnet type structure from the lattice constant.

TABLE 1

| Holding time | a (Å) | V (Å$^3$) |
| --- | --- | --- |
| 24 h | 13.1057(1) | 2251.04(7) |
| 48 h | 13.1062(1) | 2251.31(7) |
| 120 h | 13.1060(1) | 2251.17(7) |
| 240 h | 13.1035(1) | 2249.90(7) |

Figure 3:
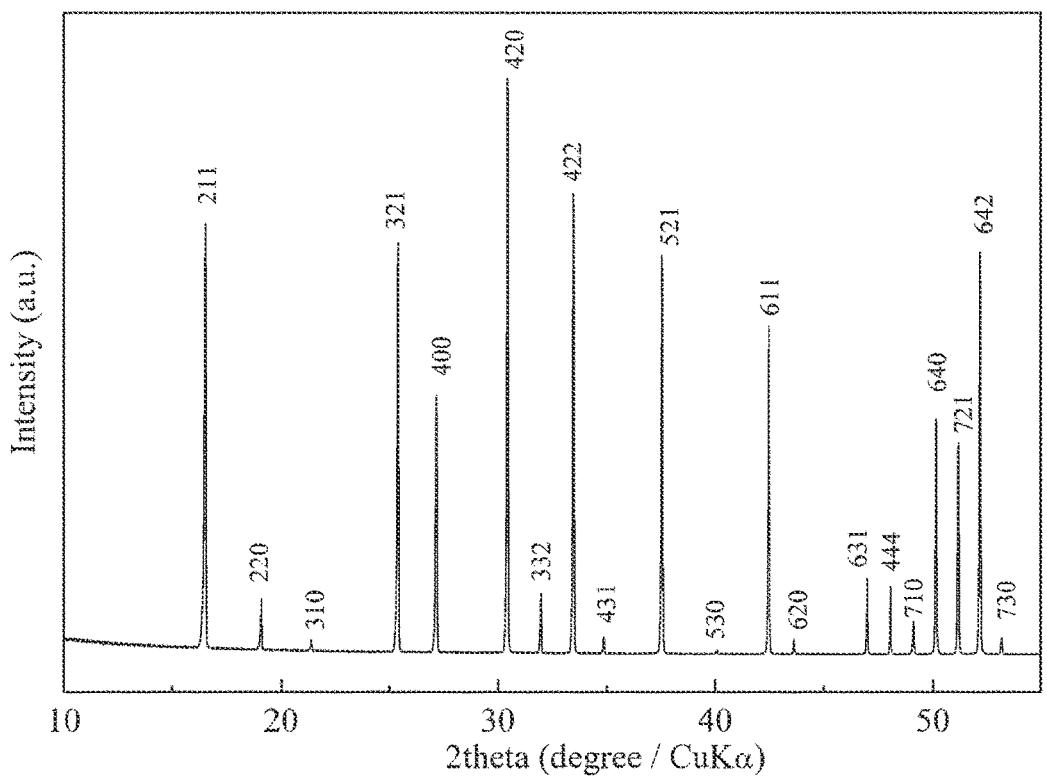
FIG. 3 is a powder X-ray diffraction chart of the complex oxide $Li_{7-x}H_xLa_3Zr_2O_{12}$ ($3.2 < x \leq 6.6$) obtained in Example 1 that is indexed with a space group I-43d.

In addition, as shown in FIG. 2, new peaks that are not able to be indexed with a known space group Ia-3d which is frequently observed in a garnet type were observed near 22°, 40°, 49°, and 53°. These peaks can be respectively indexed by indexes 310, 530, 710, and 730 with the space group I-43d of the same cubic system. It was confirmed that the complex oxide obtained in the example has a new crystal structure which has not been reported. The indexed powder X-ray diffraction chart of the complex oxide at a holding time of 120 hours is shown in FIG. 3.

In addition, regarding the complex oxides at each holding time of 10 hours, 24 hours, 48 hours, 120 hours, and 240 hours, the quantitative analysis of the amount of lithium, the amount of lanthanum, and the amount of zirconium was carried out using an ICP emission analyzer (P-4010 type, manufactured by Hitachi, Ltd.). The result thereof is shown in Table 2. On the assumption that lithium is exchanged for hydrogen, it was found that each complex oxide was $Li_{7-x}H_xLa_3Zr_2O_{12}$ ($3.2 < x \leq 6.6$).

TABLE 2

| Holding time | Chemical composition (molar ratio of La fixed to 3) | | | |
|---|---|---|---|---|
| | Li | H | La | Zr |
| 10 h | 2.65 | 4.35 | 3 | 1.96 |
| 24 h | 1.71 | 5.29 | 3 | 1.99 |
| 48 h | 1.59 | 5.41 | 3 | 2.00 |
| 120 h | 1.60 | 5.40 | 3 | 2.01 |
| 240 h | 1.75 | 5.25 | 3 | 2.08 |

Figure 4A:
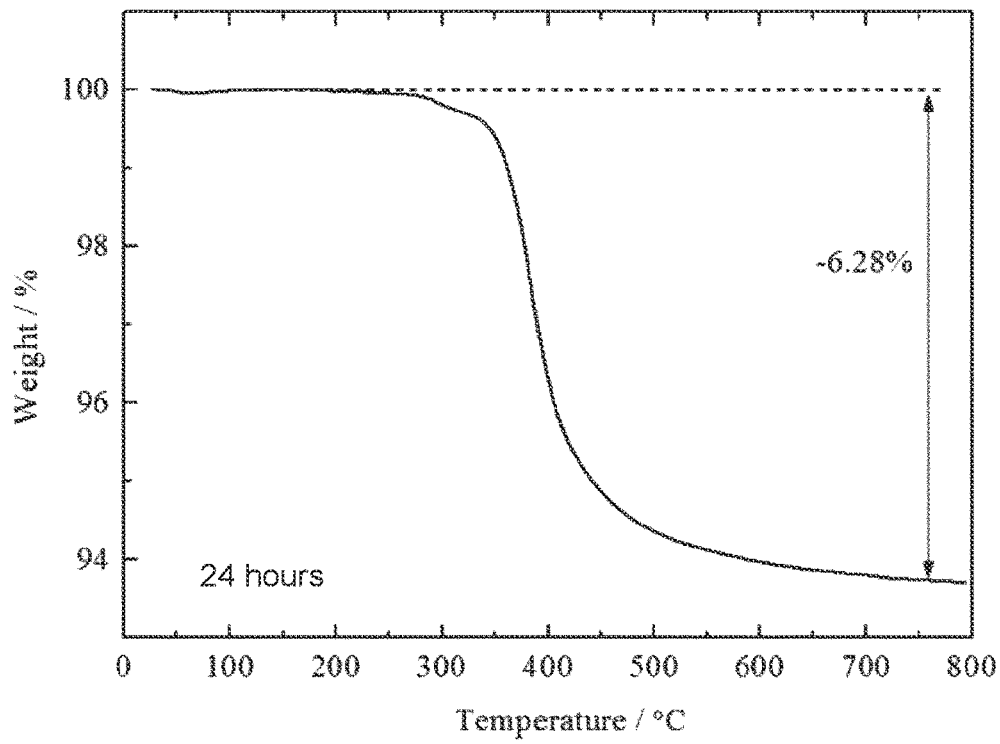
FIG. 4A is a graph showing a change in thermal weight of $Li_{1.37}H_{5.63}La_3Zr_2O_{12}$ obtained at a holding time of 24 hours in Example 1.
Figure 4B:
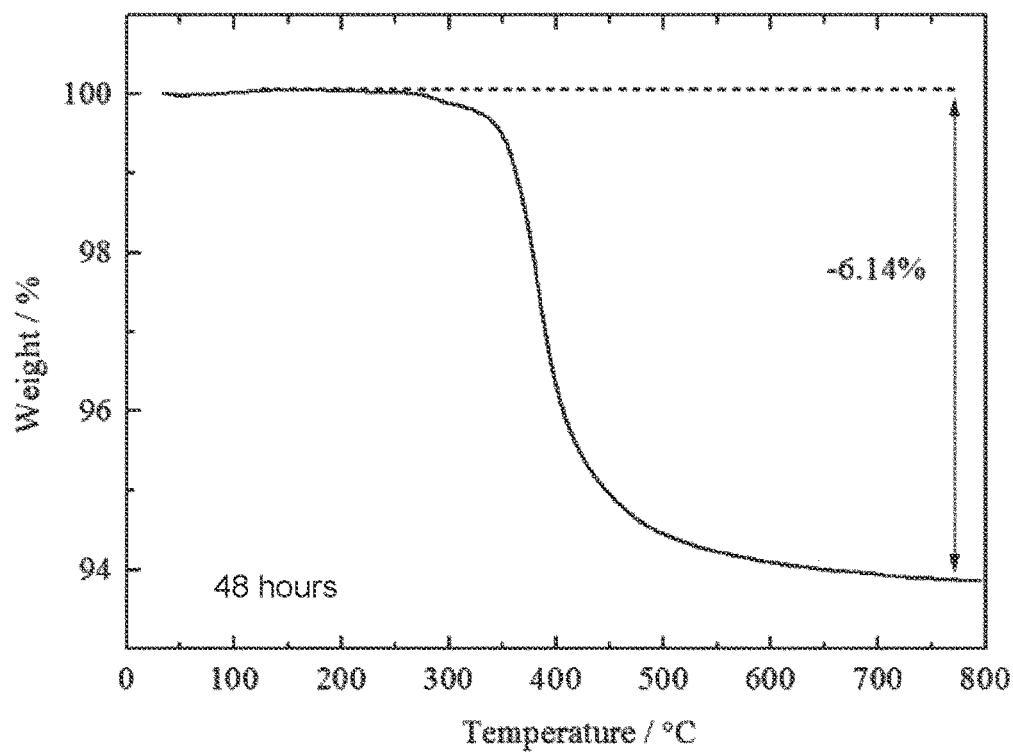
FIG. 4B is a graph showing a change in thermal weight of $Li_{1.49}H_{5.51}La_3Zr_2O_{12}$ obtained at a holding time of 48 hours in Example 1.
Figure 4C:
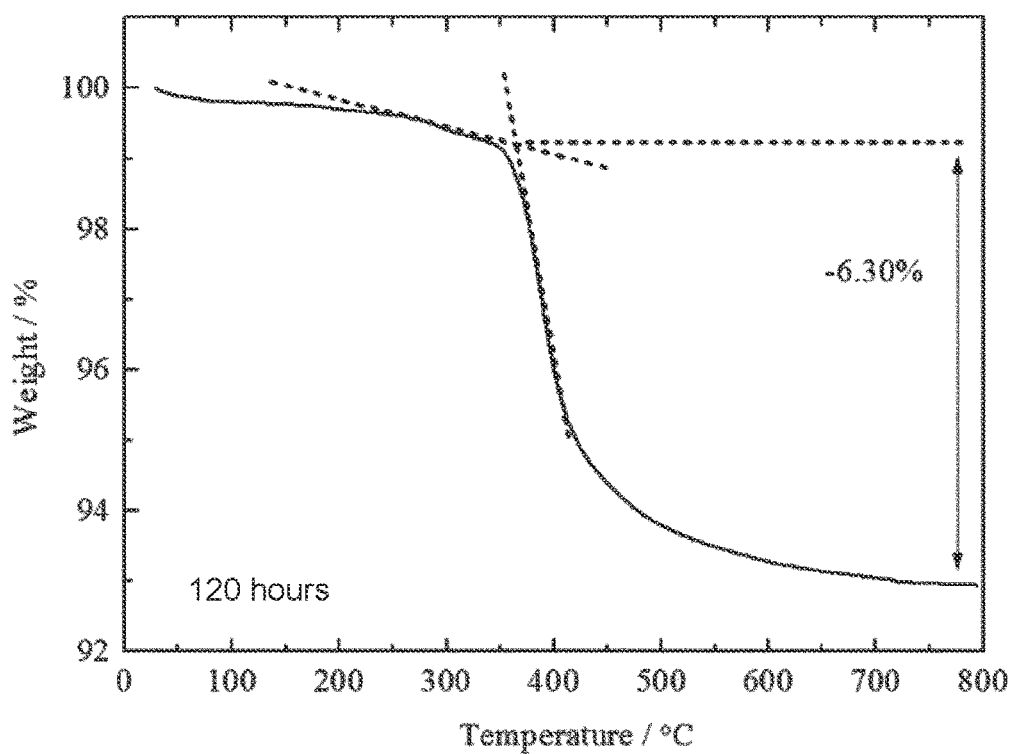
FIG. 4C is a graph showing a change in thermal weight of $Li_{1.36}H_{5.64}La_3Zr_2O_{12}$ obtained at a holding time of 120 hours in Example 1.

Next, using a simultaneous thermogravimetric and differential thermal analytic measurement device (EXSTAR TG/DTA7200, manufactured by SII Nano Technology Inc. Ltd.), the thermal analysis of the complex oxides at each holding time of 24 hours, 48 hours, and 120 hours was carried out at a temperature rising rate of 10° C./min in a temperature range of 20° C. to 800° C. in a dry air atmosphere. The thermogravimetric (TG) curves are shown in FIGS. 4A to 4C. The weight reductions of the complex oxides at each holding time of 24 hours, 48 hours, and 120 hours in a range of 20° C. to 800° C. were respectively 6.28 wt %, 6.14 wt %, and 6.30 wt %.

Assuming that the weight reduction is caused by volatilization of hydrogen included in the complex oxide in the form of $H_2O$, the chemical formulae of each complex oxide at each holding time of 24 hours, 48 hours, and 120 hours could be calculated as $Li_{1.37}H_{5.63}La_3Zr_2O_{12}$, $Li_{1.49}H_{5.51}La_3Zr_2O_{12}$, and $Li_{1.36}H_{5.64}La_3Zr_2O_{12}$, respectively.

In addition, the powder sample was pressed into pellets having a diameter Φ of 10 mm at a pressure of 60 MPa to prepare a solid electrolyte and Au was sputtered onto both surfaces of the solid electrolyte with a diameter Φ of 7 mm to form blocking electrodes. The conductivity of the solid electrolyte was measured under the conditions at a frequency of 32 MHz to 100 Hz and an amplitude voltage of 100 mV using a frequency response analyzer (FRA) (1260 type, manufactured by Solatron Co., Ltd.). Then, a resistant value was obtained from the arc of a Nyquist plot and the conductivity was calculated from the resistant value.

Figure 5:
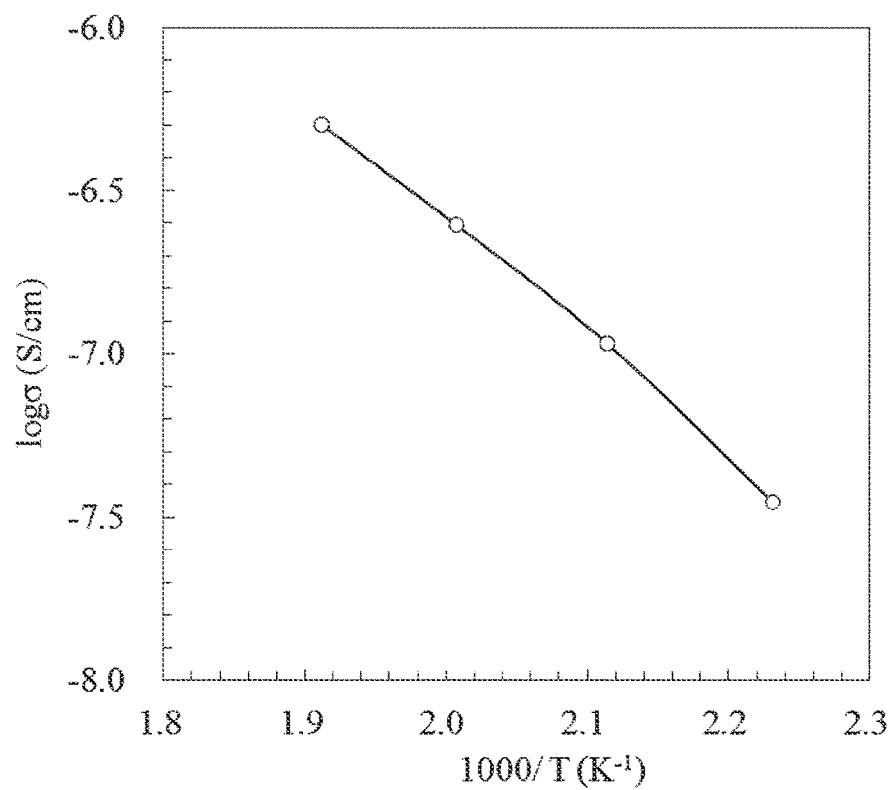
FIG. 5 is a graph showing the temperature dependency of the conductivity of a solid electrolyte prepared from $Li_{1.36}H_{5.64}La_3Zr_2O_{12}$ obtained at a holding time of 120 hours in Example 1.

Further, the solid electrolyte was heated to 150° C. to 250° C. by a heater, while a predetermined temperature was being maintained, the conductivity of the solid electrolyte was measured, and the temperature dependency of the conductivity of the solid electrolyte was confirmed. The temperature dependency of the conductivity of the solid electrolyte is shown in FIG. 5. As shown in FIG. 5, the conductivity at a measurement temperature of 250° C. was $5 \times 10^{-7}$ S/cm and proton conductivity by proton exchanged with lithium of the raw material complex oxide became apparent. That is, the complex oxide obtained in the example can be used as an electrolyte of a fuel cell.

Example 2

(Synthesis of Raw Material Complex Oxide $Li_7La_3Zr_2O_{12}$ Polycrystal)

Each of raw material powders of lithium carbonate ($Li_2CO_3$, manufactured by RARE METALLIC Co., Ltd., purity: 99.99%), lanthanum oxide ($La_2O_3$, manufactured by RARE METALLIC Co., Ltd., purity: 99.99%), and zirconium oxide ($ZrO_2$, manufactured by RARE METALLIC Co., Ltd., purity: 99.99%) was weighed such that the substance amount ratio (molar ratio) became Li:La:Zr=7.7:3:2. These materials were mixed in ethanol with a mortar made of agate and dried. Then, the mixture was put into an alumina crucible with a lid (grade SSA-S, model No. C3, manufactured by NIKKATO CORPORATION) and heated at 950° C. for 5 hours in air using a muffle furnace (FP310, manufactured by Yamato Scientific Co., Ltd.).

Figure 6A:
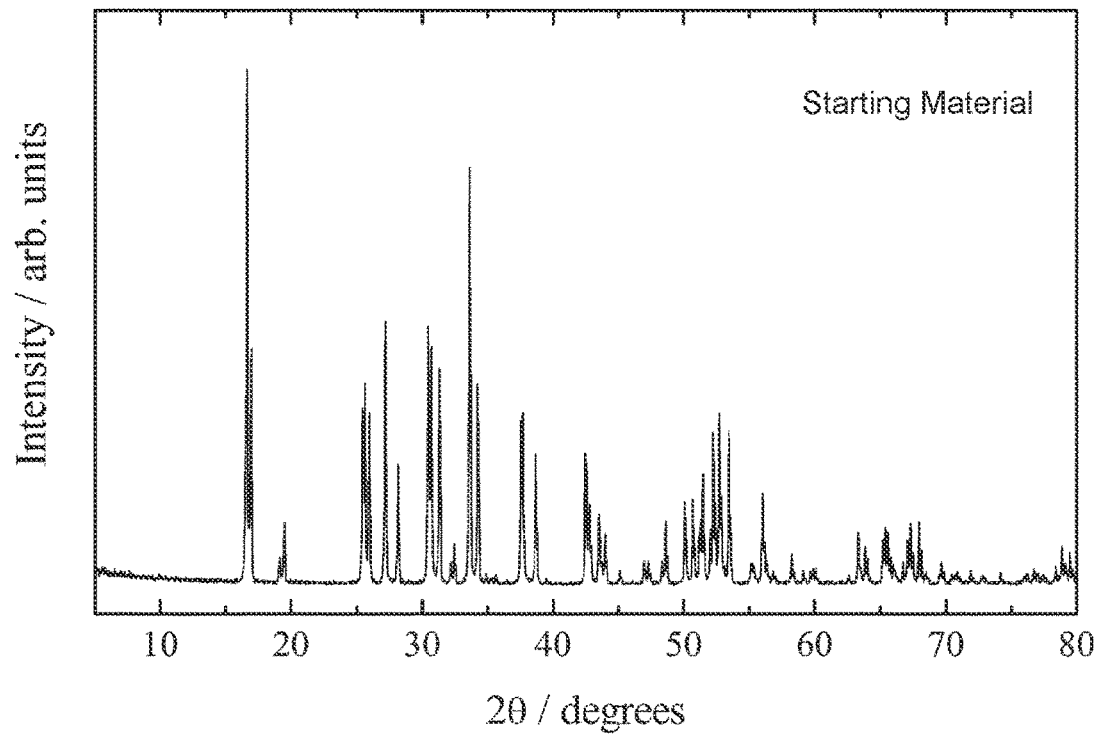
FIG. 6A is a powder X-ray diffraction chart of a raw material complex oxide $Li_7La_3Zr_2O_2$ obtained in Example 2.

Thereafter, pulverization and mixing were carried out again and heating was carried out again at 980° C. for 5 hours in air to obtain a raw material complex oxide $Li_7La_3Zr_2O_{12}$ sample. The crystal structure of the obtained raw material complex oxide was investigated by a powder X-ray diffraction device (trade name: RINT-2550V, manufactured by Rigaku Corporation). It was confirmed that the raw material complex oxide (starting material) has good crystallinity and is a single phase of a garnet type structure belonging to a known tetragonal system. The powder X-ray diffraction chart is shown in FIG. 6A.

(Synthesis of Complex Oxide $Li_{7-x}H_xLa_3Zr_2O_{12}$ ($3.2 < x \leq 6.6$))

1 g of the raw material complex oxide $Li_7La_3Zr_2O_{12}$ powder synthesized above and 20 mL of anhydrous ethanol were put into a PTFE beaker having an internal volume of 100 mL, and the beaker was set in a SUS pressure resistant vessel. The SUS pressure resistant vessel was put into a dryer and held at a highest temperature of 120° C. for 24 hours. Thereafter, cooling was carried out, the resultant was washed with ethanol, and then only the powder was taken out. Then, the powder was dried in air at 60° C. to collect the powder sample of the complex oxide.

Powder samples of each complex oxide were collected in the same manner as described above except that instead of using 20 mL of anhydrous ethanol, 20 mL of 1-hexanol (guaranteed grade reagent, manufactured by Wako Pure Chemical Industries, Ltd.) or 20 mL of 2-propanol (guaranteed grade reagent, manufactured by Wako Pure Chemical Industries, Ltd.) was used. The crystal structure of each of the obtained complex oxides was investigated by a powder X-ray diffraction device (trade name: RINT-2550V, manufactured by Rigaku Corporation). It was confirmed that all of these complex oxides are single phases of a garnet type structure having good crystallinity. The powder X-ray diffraction charts thereof are shown in FIGS. 6B (using anhydrous ethanol), 6C (using 1-hexanol), and 6D (using 2-propanol).

Figure 6B:
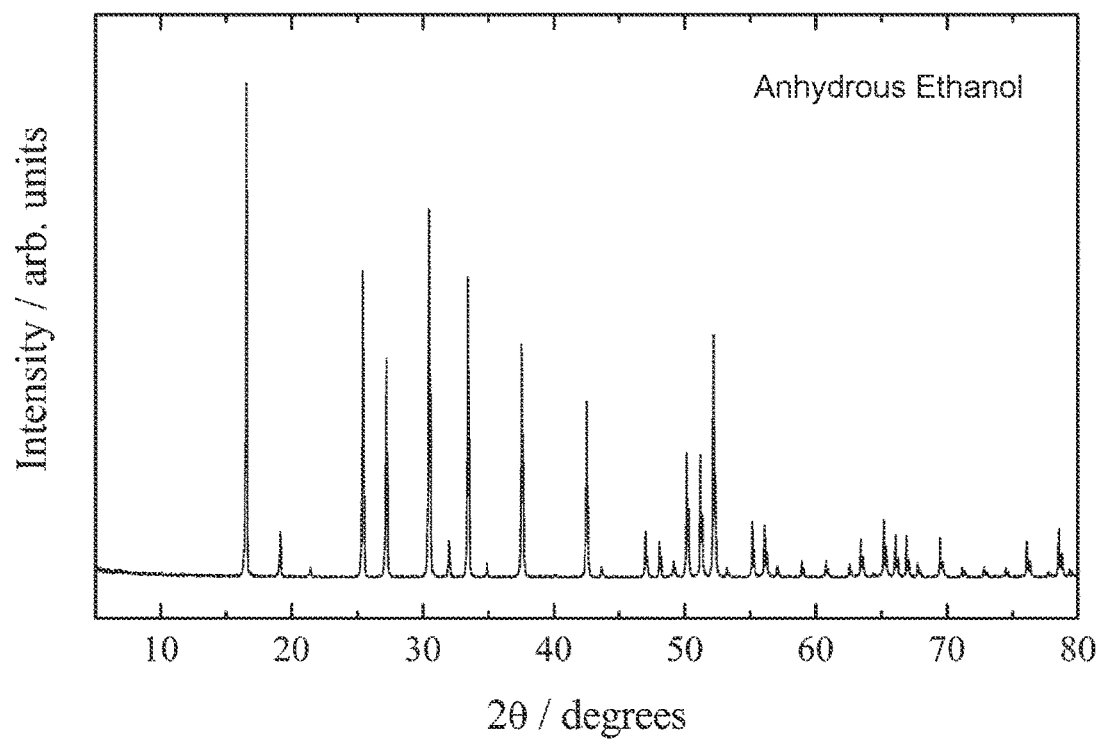
FIG. 6B is a powder X-ray diffraction chart of a complex oxide $Li_{7-x}H_xLa_3Zr_2O_{12}$ ($3.2 < x \leq 6.6$) obtained by using anhydrous ethanol in Example 2.
Figure 6C:
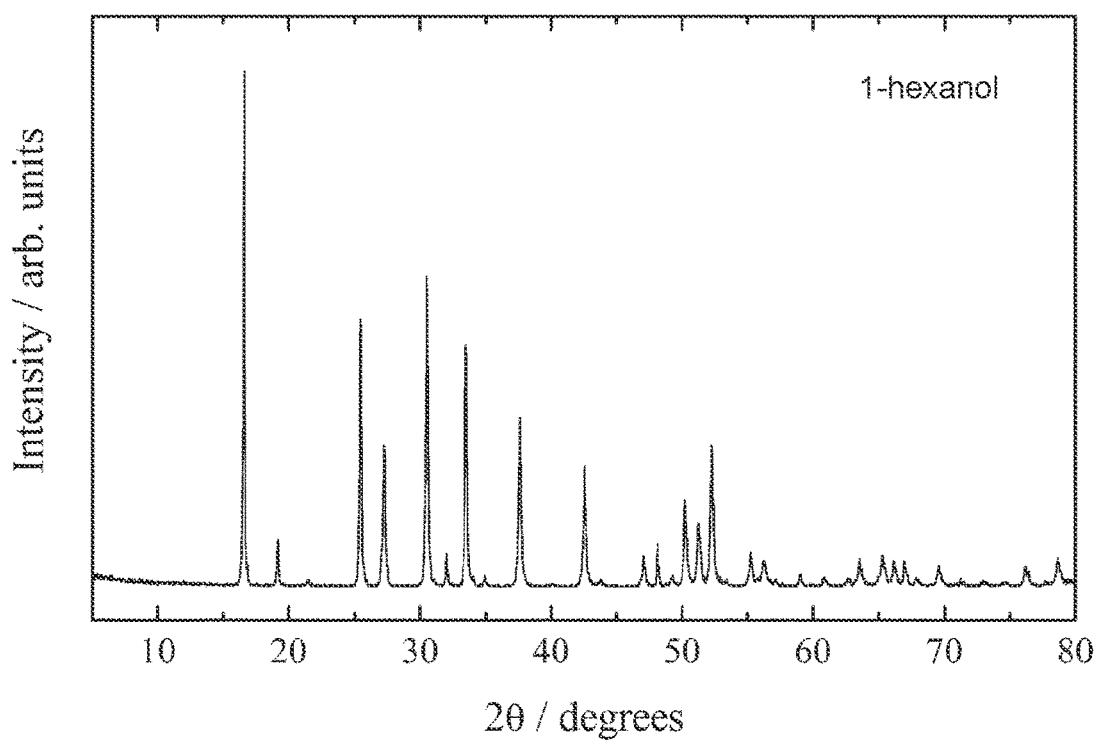
FIG. 6C is a powder X-ray diffraction chart of a complex oxide $Li_{7-x}H_xLa_3Zr_2O_{12}$ ($3.2 < x \leq 6.6$) obtained by using 1-hexanol in Example 2.
Figure 6D:
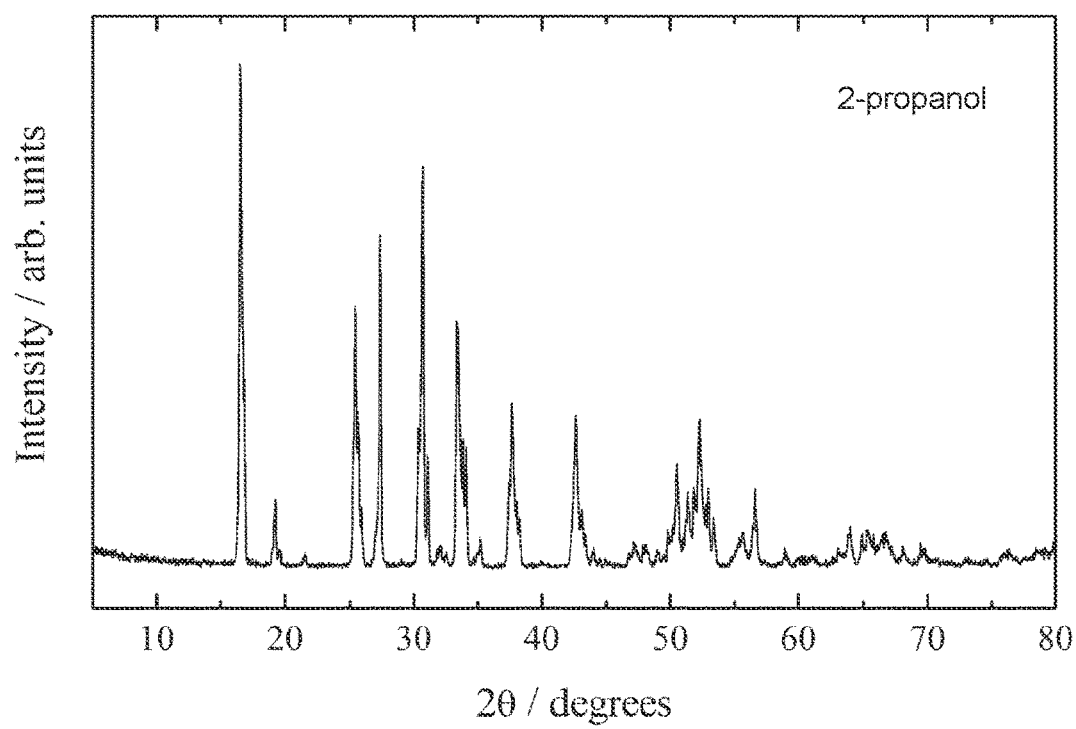
FIG. 6D is a powder X-ray diffraction chart of a complex oxide $Li_{7-x}H_xLa_3Zr_2O_{12}$ ($3.2 < x \leq 6.6$) obtained by using 2-propanol in Example 2.

As shown in FIGS. 6B to 6D, in the charts of these complex oxides, compared to the chart of the raw material complex oxide (FIG. 6A), there is little tetragonal system peak separation and the crystal structure is cubic. In addition, since apparent peaks were observed near 22° and 53°, it could be confirmed that the crystal structure of these complex oxides is not a space group Ia-3d but a space group I-43d. Thus, in a case where lithium of the raw material complex oxide and hydrogen of a compound having a hydroxy group or a carboxyl group were exchanged to synthesize a complex oxide having a crystal structure of I-43d suitable for a proton conductor, it was found that the compound having a hydroxy group or a carboxyl group may be not only ethanol but also 1-hexanol or 2-propanol. That is, as long as the compound is a compound having a hydroxy group or a carboxyl group, it was found that the kind thereof is not selected. On the other hand, in a case of using 1-hextanol and a case of using 2-propanol, it was found that proton exchange is further advanced in the case of using 1-hexanol and the use of primary alcohol is more preferable.

Example 3

(Synthesis of Raw Material Complex Oxide $Li_7La_3Zr_2O_{12}$ Single Crystal)

1 g of the raw material complex oxide $Li_7La_3Zr_2O_{12}$ polycrystal powder synthesized in Example 2 and 1 g of lithium carbonate were weighed, mixed in a wet method, and dried. Then, the mixture was put into a gold crucible with a lid having an internal volume of 30 mL and heated at 1040° C. for 96 hours in air using a muffle furnace. Then, cooling to room temperature was carried out for 12 hours and a product was sufficiently washed with water. Thus, a polyhedral raw material complex oxide $Li_7La_3Zr_2_{12}$ single crystal sample having a size of about 30 to 100 µm was obtained. The crystal structure of the raw material complex oxide was investigated using a single crystal X-ray diffraction device (trade mane: AFC-7S, manufactured by Rigaku Corporation). It was confirmed that the raw material complex oxide has good single crystallinity and has a garnet type structure belonging to a known tetragonal system.

(Synthesis of Complex Oxide $Li_{1.5}H_{5.5}La_3Zr_2O_{12}$ Single Crystal)

0.1 g of the raw material complex oxide $Li_7La_3Zr_2O_{12}$ single crystal synthesized above and 20 mL of anhydrous ethanol were put into a PTFE beaker having an internal volume of 100 mL and the beaker was set in a SUS pressure resistant vessel. The SUS pressure resistant vessel was put into a dryer and held at a highest temperature of 120° C. for 186 hours. Thereafter, cooling was carried out, the resultant was washed with ethanol, and only the single crystal sample was taken out. Then, the sample was dried in air at 60° C. to collect the powder sample of the complex oxide.

Figure 7:
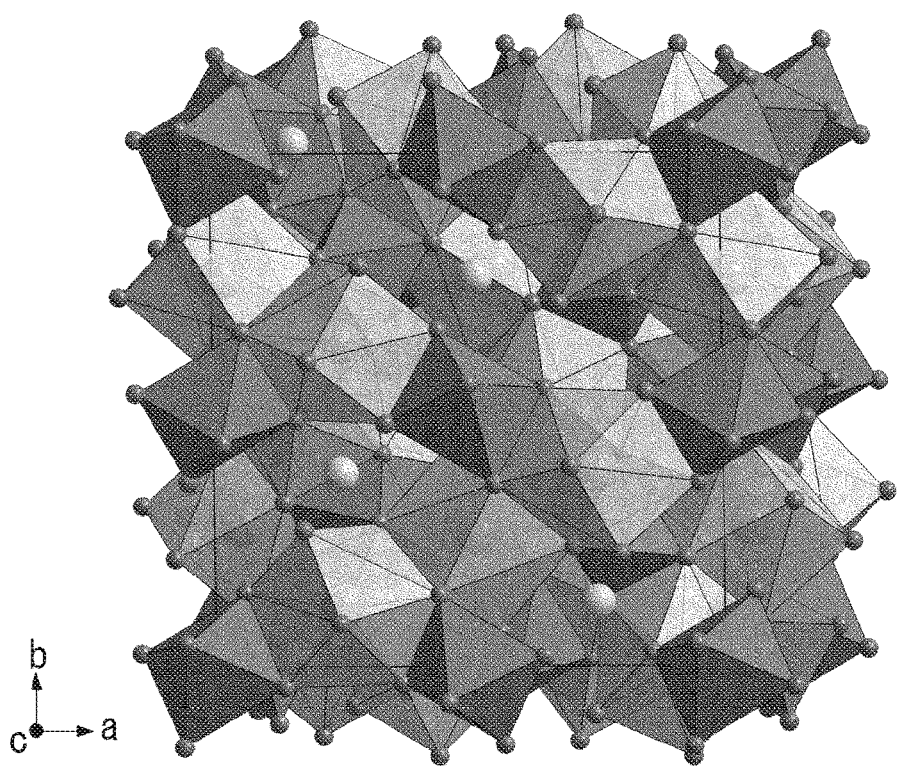
FIG. 7 is a view showing an atom arrangement of a crystal structure of a complex oxide $Li_{1.5}H_{5.5}La_3Zr_2O_{12}$ single crystal obtained in Example 3.

The crystal structure of the complex oxide was investigated using a single crystal X-ray diffraction apparatus. It was confirmed that the complex oxide has good single crystallinity and has a garnet type structure belonging to a space group I-43d of a cubic system. In addition, the cubic system lattice constant a determined by single crystal X-ray diffraction was 13.075(3) Å. Further, the single crystal X-ray structure analysis was carried out by using collected single crystal X-ray diffraction intensity data (program: Xtal 3.7 was used). As a result, it was found that the obtained complex oxide was a new substance having atomic coordinates different from those in a known garnet type crystal structure. The atomic coordinate of the complex oxide in which the final R value is determined with an accuracy of 3.8% is shown in Table 3. Since the X-ray scattering power was excessively weak, the atomic position of the hydrogen atom could not be determined. However, the lithium atom position could be exactly determined. The crystal structural formula of the complex oxide was $Li_{1.5}H_{5.5}La_3Zr_2O_{12}$. The crystal structural view is shown in FIG. 7.

TABLE 3

| Atom | Site | x | y | z | $U_{eq}$ (Å$^2$) | g |
|---|---|---|---|---|---|---|
| La1 | 24d | 0.250 | 0.11872(4) | 0 | 0.0114(2) | 1 |
| Zr1 | 16c | 0.51221(4) | −0.01221(4) | 0.01221(4) | 0.0103(2) | 1 |
| Li1 | 12a | 0 | 0.25 | 0.375 | 0.012(11) | 1 |
| O1 | 48e | 0.4455(4) | 0.1426(4) | 0.0365(4) | 0.015(2) | 1 |
| O2 | 48e | 0.6531(3) | 0.0231(3) | 0.0607(3) | 0.0098(17) | 1 |

Figure 8:
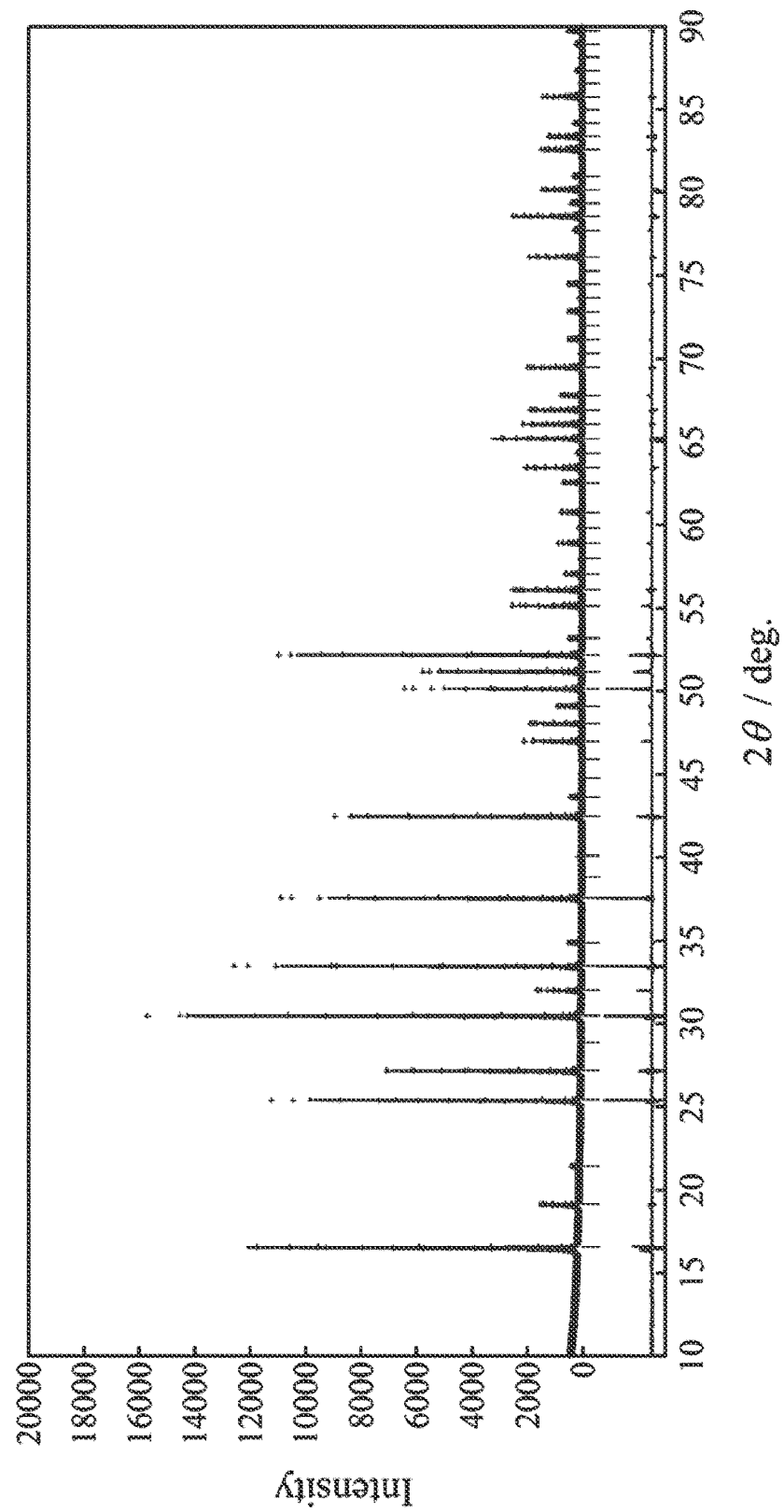
FIG. 8 is a powder X-ray diffraction chart showing fitting obtained by carrying out Rietveld analysis on the powder X-ray diffraction data of the complex oxide $Li_{1.36}H_{5.64}La_3Zr_2O_{12}$ obtained at a holding time of 120 hours in Example 1, using the atomic coordinates of the $Li_{1.5}H_{5.5}La_3Zr_2O_{12}$ single crystal obtained in Example 3 as initial values.

In addition, the identified atomic coordinates were used as the initial structural model, and the crystal structure analysis regarding the powder X-ray diffraction data of the complex oxide obtained at a holding time of 120 hours in Example 1 was carried out by a Rietveld method using a program RIETAN-FP. As a result, it was confirmed that good fitting of $R_{wp}$=13.38% and $R_e$=6.95% as the final R values is exhibited and the crystal structure of the polycrystal complex oxide obtained in Example 1 is the same as the crystal structure of the single crystal complex oxide obtained in the example. The fitted pattern is shown in FIG. 8.

Example 4

(Synthesis of Raw Material Complex Oxide $Li_7La_3Hf_2O_{12}$)

Figure 9:
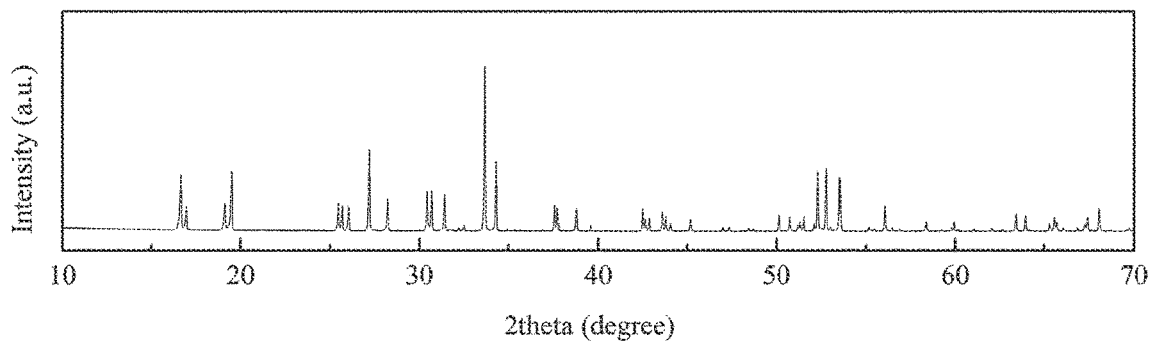
FIG. 9 is a powder X-ray diffraction chart showing a raw material complex oxide $Li_7La_3Hf_2O_{12}$ obtained in Example 4.

Each of raw material powders of lithium carbonate, lanthanum oxide, and hafnium oxide ($HfO_2$, manufactured by RARE METALLIC Co., Ltd., purity: 99.99%) was weighed such that the substance amount ratio became Li:La:Hf=7.7:3:2. These materials were mixed in ethanol with a mortar made of agate and dried. Then, the mixture was put into an alumina crucible with a lid and heated at 950° C. for 5 hours in air using a muffle furnace. Thereafter, pulverization and mixing were carried out and heating was carried out again at 980° C. for 5 hours in air to obtain a raw material complex oxide $Li_7La_3Hf_2O_{12}$. The crystal structure of the obtained raw material complex oxide was investigated by a powder X-ray diffraction apparatus (trade name: SmartLab (3 kW), manufactured by Rigaku Corporation). It was confirmed that the raw material complex oxide has good crystallinity and is a single phase of a garnet type structure belonging to a known tetragonal system. The powder X-ray diffraction chart is shown in FIG. 9.

(Synthesis of Complex Oxide $Li_{1.93}H_{5.07}La_3Hf_2O_{12}$)

Figure 10:
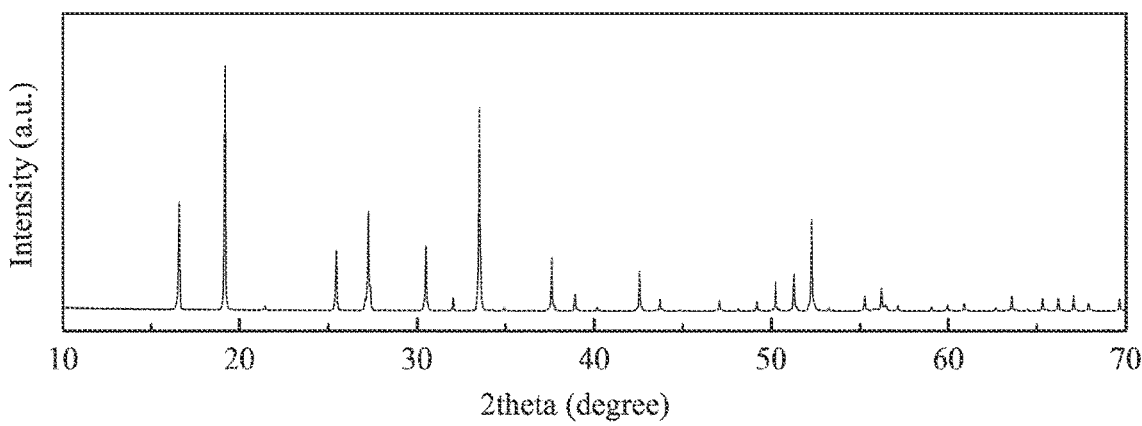
FIG. 10 is a powder X-ray diffraction chart of a complex oxide $Li_{1.93}H_{5.07}La_3Hf_2O_{12}$ obtained in Example 4.

A complex oxide powder sample was collected in the same manner as in Example 2 using anhydrous ethanol except that instead of using the raw material complex oxide $Li_7La_3Zr_2O_{12}$, the raw material complex oxide $Li_7La_3Hf_2O_{12}$ synthesized above was used. The crystal structure of the obtained complex oxide was investigated by a powder X-ray diffraction apparatus (trade name: SmartLab (3 kW), manufactured by Rigaku Corporation). It was confirmed that the complex oxide is a single phase of a garnet type structure having good crystallinity. The powder X-ray diffraction chart is shown in FIG. 10. As shown in FIG. 10, in the chart of the complex oxide, tetragonal system peak separation does not occur and the crystal structure is cubic. In addition, it was confirmed that the crystal structure of the complex oxide is not a space group Ia-3d but a space group I-43d since apparent peaks are observed near 22° and 53°. Further, the lattice constant a calculated by the least squares method was 13.0772(1) Å.

Figure 11:
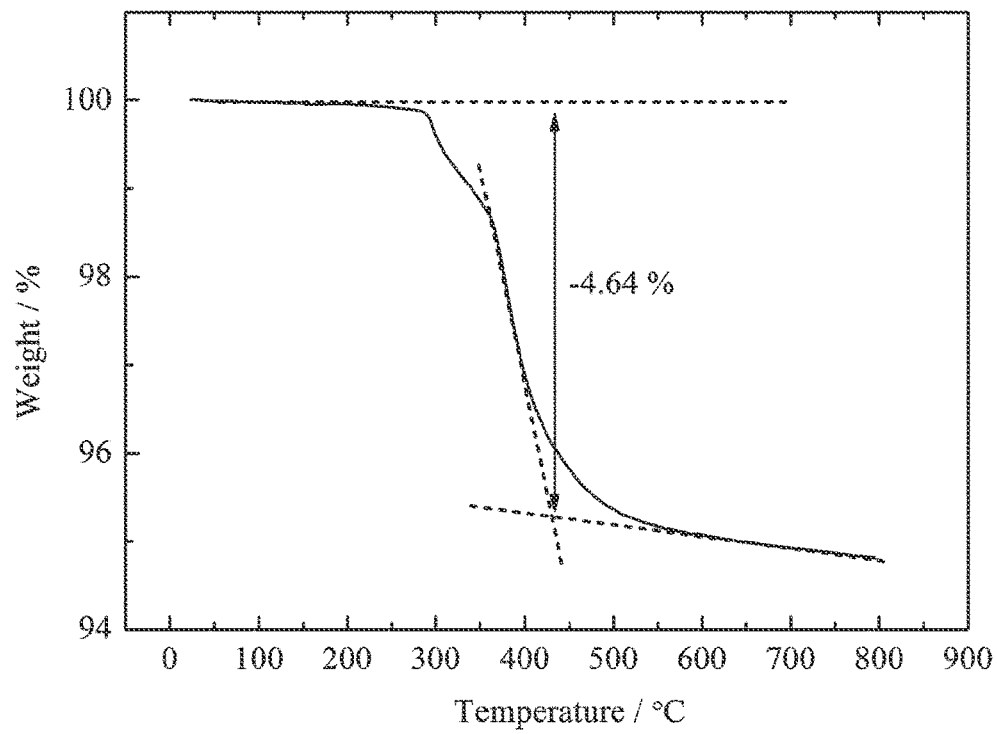
FIG. 11 is a graph showing a change in thermal weight of the complex oxide $Li_{1.93}H_{5.07}La_3Hf_2O_{12}$ obtained in Example 4.

Next, as in Example 1, the thermal analysis of the complex oxide was carried out. The TG curve is shown in FIG. 11. A weight loss from 20° C. to 800° C. was 4.64 wt %. Assuming that the weight loss is the same as in the case of Example 1, it was possible to calculate the chemical formula of the complex oxide as $Li_{1.93}H_{5.07}La_3Hf_2O_{12}$. In the synthesizing method of the example, it was confirmed that a large amount of lithium included in the raw material complex oxide was exchanged for hydrogen.

Example 5

(Synthesis of Complex Oxide $Li_{0.05}H_{6.95}La_3Hf_2O_{12}$)

1 g of the raw material complex oxide $Li_7La_3Hf_2O_{12}$ powder of Example 4, 20 mL of ion exchange water, and 2 g of benzoic acid ($C_7H_6O_2$, manufactured by Wako Pure Chemical Industries, Ltd., purity: 99.5%) powder were put into a PTFE beaker having an internal volume of 100 mL and the beaker was set in a SUS pressure resistant vessel. The SUS pressure vessel was put into a dryer and held at a highest temperature of 200° C. for 24 hours. Thereafter, cooling was carried out, the product was washed with ethanol, and only the powder was taken out. Then, the powder was dried in air at 60° C. to collect the powder sample of the complex oxide.

Figure 12:
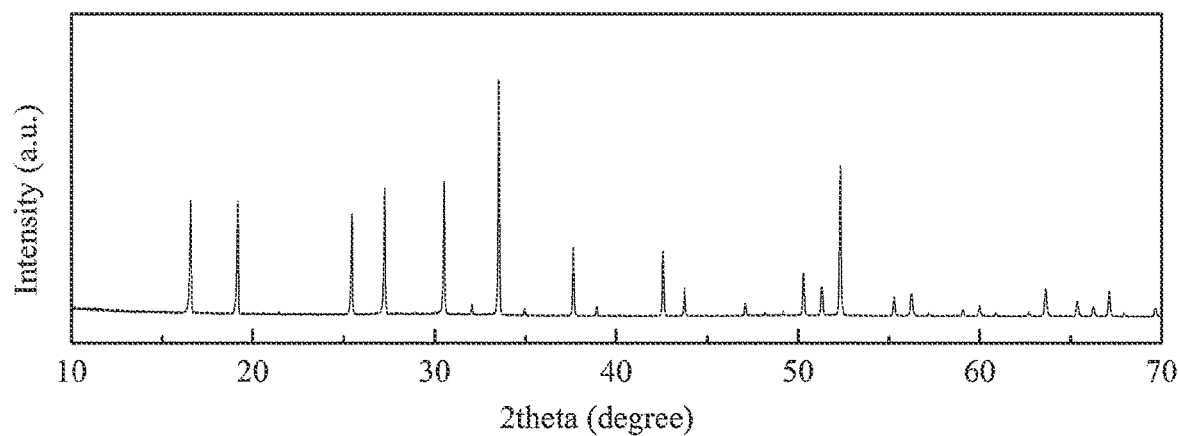
FIG. 12 is a powder X-ray diffraction chart of a complex oxide $Li_{0.05}H_{6.95}La_3Hf_2O_{12}$ obtained in Example 5.

The crystal structure of the obtained complex oxide was investigated using a powder X-ray diffraction apparatus (trade name: SmartLab (3 kW), manufactured by Rigaku Corporation). It was confirmed that the complex oxide is a single phase of a garnet type structure having good crystallinity. The powder X-ray diffraction chart is shown in FIG. 12. As shown in FIG. 12, in the chart of the complex oxide, compared to the chart of the raw material complex oxide (FIG. 9), tetragonal system peak separation does not occur and the crystal structure is cubic. In addition, it could be confirmed that the peaks observed in the chart of the complex oxide may belong to a space group Ia-3d. Further, the lattice constant a calculated by the least squares method was 13.0710(2) Å.

Figure 13:
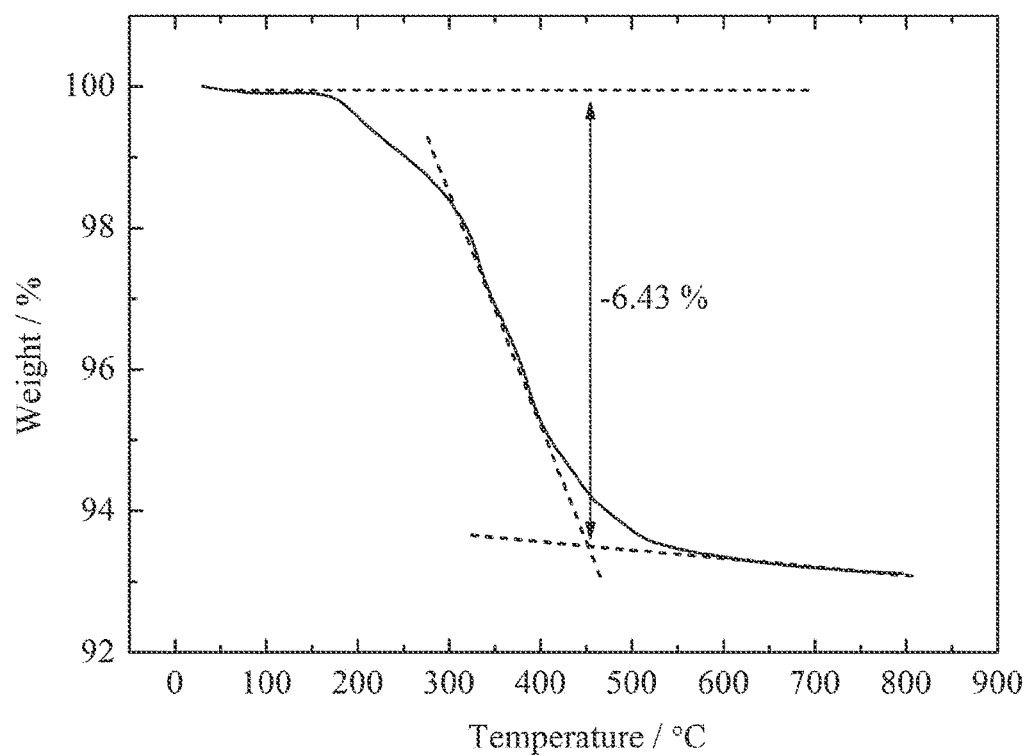
FIG. 13 is a graph showing a change in thermal weight of the complex oxide $Li_{0.05}H_{6.95}La_3Hf_2O_{12}$ obtained in Example 5.

Next, as in Example 1, the thermal analysis of the complex oxide was carried out. The TG curve is shown in FIG. 13. A weight loss from 20° C. to 800° C. was 6.43 wt %. Assuming that the weight loss is the same as in the case of Example 1, it was possible to calculate the chemical formula of the complex oxide as $Li_{0.05}H_{6.95}La_3Hf_2O_{12}$. In the synthesizing method of the example, it was confirmed that most lithium included in the raw material complex oxide was exchanged for hydrogen.

Example 6

(Reflux Synthesis of Complex Oxide $Li_{7-x}H_xLa_3Zr_2O_{12}$ ($3.2<x\leq6.6$))

5 g of a raw material complex oxide $Li_7La_3Zr_2O_{12}$ (manufactured by Kojundo Chemical Lab. Co., Ltd.) powder and 100 mL of 1-hexanol (guaranteed grade reagent, manufactured by Wako Pure Chemical Industries) were put into a low temperature ion exchange treatment device (trade name: Chemi Chemi-200 type, manufactured by SIBATA SCIENTIFIC TECHNOLOGY LTD.) and the materials were subjected to a reflux operation under stirring at four kinds of synthesis temperatures of 100° C., 120° C., 140° C., and 160° C. for 24 hours. Thereafter, the resultant was washed with anhydrous ethanol and only the powder was taken out. Then, the powder was dried in air at 60° C. to collect the powder samples of each complex oxide.

Figure 14:
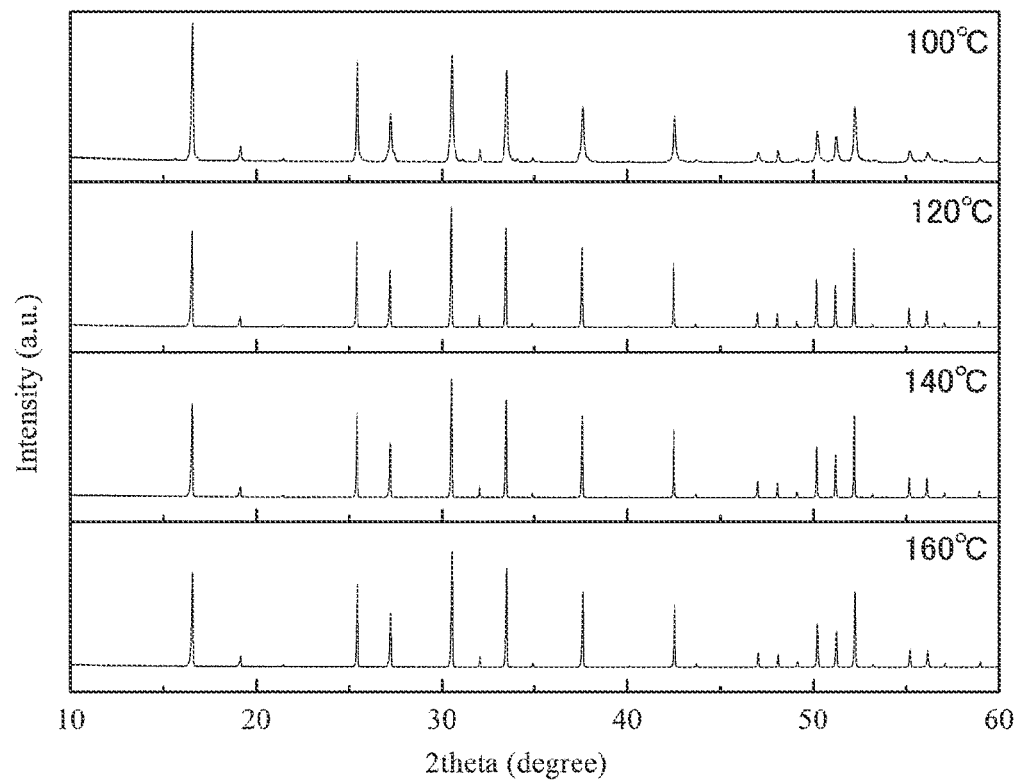
FIG. 14 is a powder X-ray diffraction chart of a complex oxide $Li_{7-x}H_xLa_3Zr_2O_{12}$ ($3.2<x\le6.6$) obtained in Example 6.

The crystal structures of the obtained complex oxides were investigated by a powder X-ray diffraction device (trade name: SmartLab (3 kW), manufactured by Rigaku Corporation). It was confirmed that all of the complex oxides are single phases of a garnet type structure having good crystallinity. The powder X-ray diffraction chart is shown in FIG. 14. As shown in FIG. 14, in the chart of the complex oxide, tetragonal system peak separation does not occur and the crystal structure is cubic. In addition, since apparent peaks were observed near 22° and 53°, it could be confirmed that the crystal structure of each complex oxide is not a space group Ia-3d but a space group I-43d. As a result of calculating the lattice constants a of these complex oxides of a cubic system which is the average structure by the least squares method, the values of the lattice constants were as shown in Table 4.

TABLE 4

| Synthesis temperature (° C.) | a (Å) | V (Å$^3$) |
|---|---|---|
| 100 | 13.0924(1) | 2244.20(7) |
| 120 | 13.1008(1) | 2248.49(7) |
| 140 | 13.0987(1) | 2247.44(7) |
| 160 | 13.0894(1) | 2242.61(7) |

Example 7

(Synthesis of Complex Oxide $Li_{0.39}H_{6.61}La_3Zr_2O_{12}$)

1 g of a raw material complex oxide $Li_7La_3Zr_{212}$ (manufactured by Kojundo Chemical Lab. Co., Ltd.) powder, 20 mL of anhydrous ethanol, and 2 g of benzoic acid (guaranteed grade reagent, manufactured by Wako Pure Chemical Industries, Ltd.) were put into a PTFE beaker having an internal volume of 100 mL and the beaker was set in a SUS pressure resistant vessel. The SUS pressure resistant vessel was put into a dryer and held at a highest temperature of 200° C. for 24 hours. Thereafter, cooling was carried out, the resultant was washed with ethanol, and only the powder was taken out. Then, the powder was dried in air at 60° C. to collect the powder sample of the complex oxide.

Figure 15:
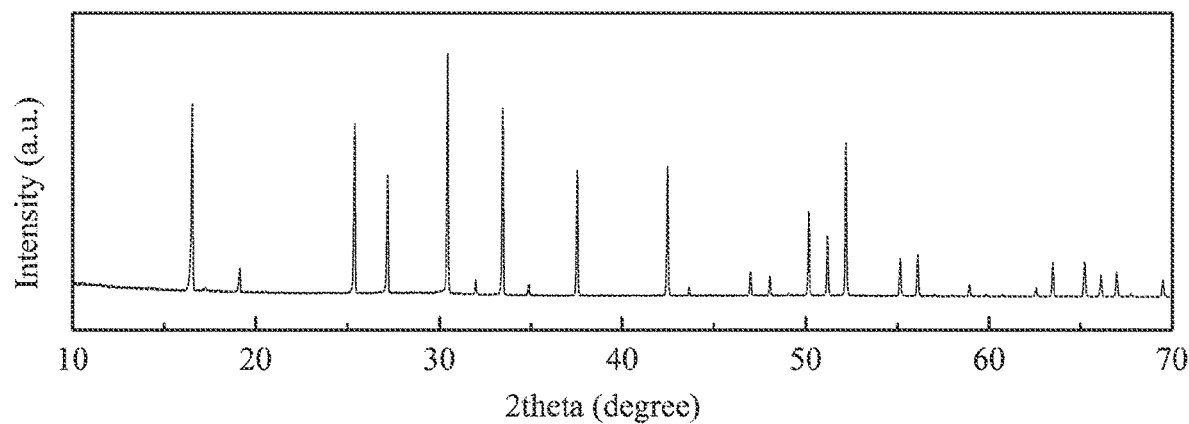
FIG. 15 is a powder X-ray diffraction chart of a complex oxide $Li_{0.39}H_{6.61}La_3Zr_2O_{12}$ obtained in Example 7.

The crystal structure of the obtained complex oxide was investigated by a powder X-ray diffraction device (trade name: SmartLab (3 kW), manufactured by Rigaku Corporation). It was confirmed that the complex oxide is a single phase of a garnet type structure having good crystallinity. The powder X-ray diffraction chart is shown in FIG. 15. As shown in FIG. 15, in the chart of the complex oxide, tetragonal system peak separation does not occur and the crystal structure is cubic. It could be confirmed that the crystal structure of the complex oxide is Ia-3d. In addition, the lattice constant a of the complex oxide calculated by the least squares method was 13.1005(2) Å.

Figure 16:
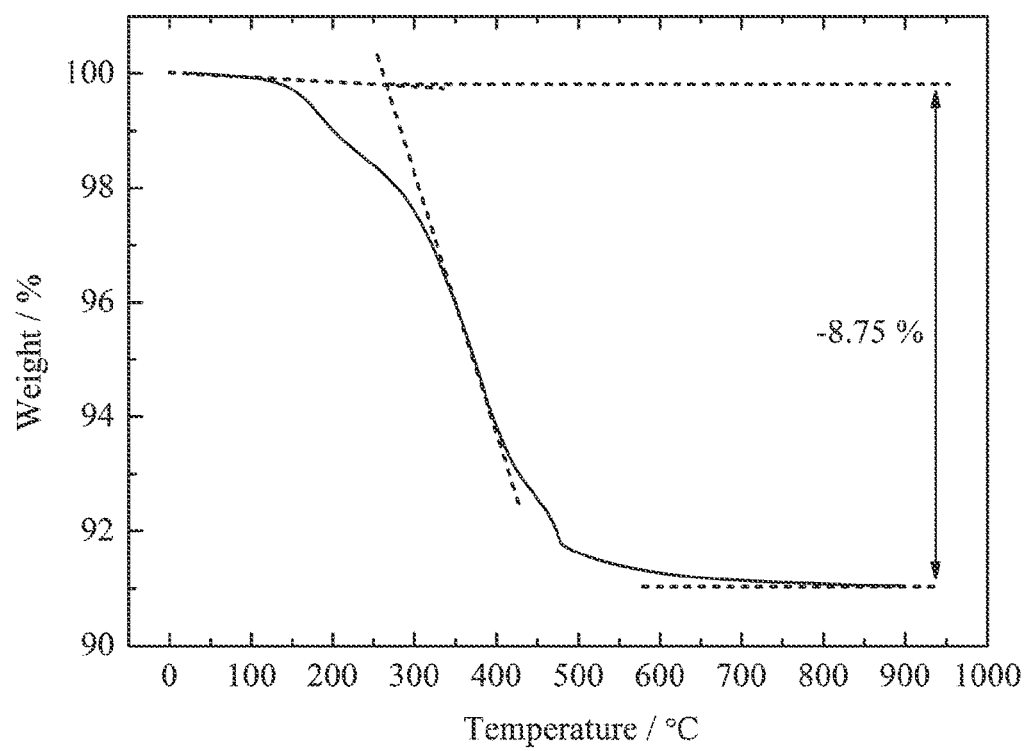
FIG. 16 is a graph showing a change in thermal weight of the complex oxide $Li_{0.39}H_{6.61}La_3Zr_2O_{12}$ obtained in Example 7.

Next, as in Example 1, the thermal analysis of the complex oxide was carried out. The TG curve is shown in FIG. 16. A weight reduction from 20° C. to 800° C. was 8.75 wt %. Assuming that the weight reduction is the same as in the case of Example 1, it was possible to calculate the chemical formula of the complex oxide as $Li_{0.39}H_{6.61}La_3Zr_2O_{12}$. Next, the quantitative analysis of the amount of lithium, the amount of lanthanum, and the amount of zirconium of the complex oxide was carried out using an ICP emission analyzer. On the assumption that lithium is exchanged for hydrogen, it was found that the complex oxide is $Li_{0.39}H_{6.61}La_3Zr_2O_{12}$.

Example 8

(Synthesis of Complex Oxide $H_7La_3Zr_2O_{12}$)

Figure 17:
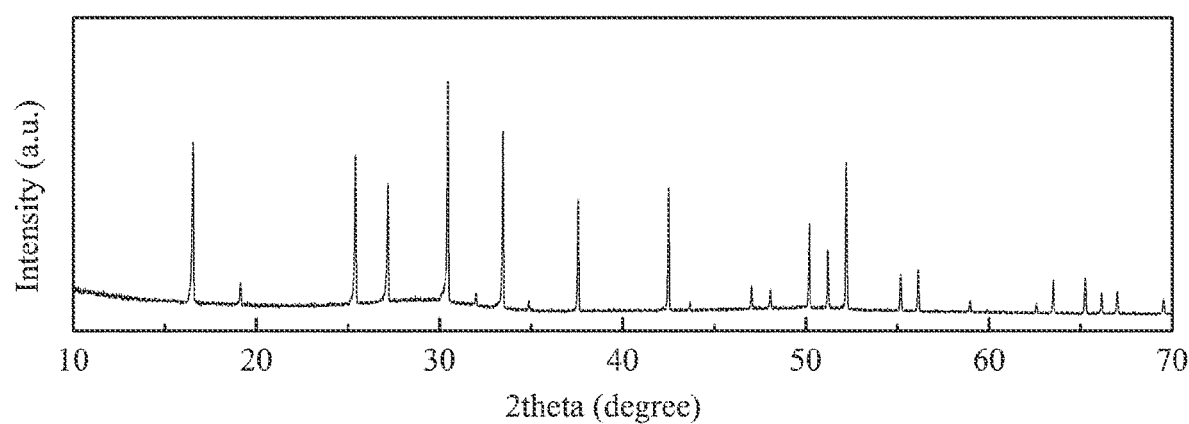
FIG. 17 is a powder X-ray diffraction chart of a complex oxide $H_7La_3Zr_2O_{12}$ obtained in Example 8.

A complex oxide powder sample was collected in the same manner as in Example 7 except that the highest temperature of the dryer was set to 220° C. The crystal structure of the obtained complex oxide was investigated by a powder X-ray diffraction device (trade name: SmartLab (3 kW), manufactured by Rigaku Corporation). It was confirmed that the complex oxide is a single phase of a garnet type structure having good crystallinity. The powder X-ray diffraction chart is shown in FIG. 17. In the chart of the complex oxide, tetragonal system peak separation does not occur and the crystal structure is cubic. It could be confirmed that the crystal structure of the complex oxide is Ia-3d. In addition, the lattice constant a of the complex oxide calculated by the least squares method was 13.0943(2) Å.

Figure 18:
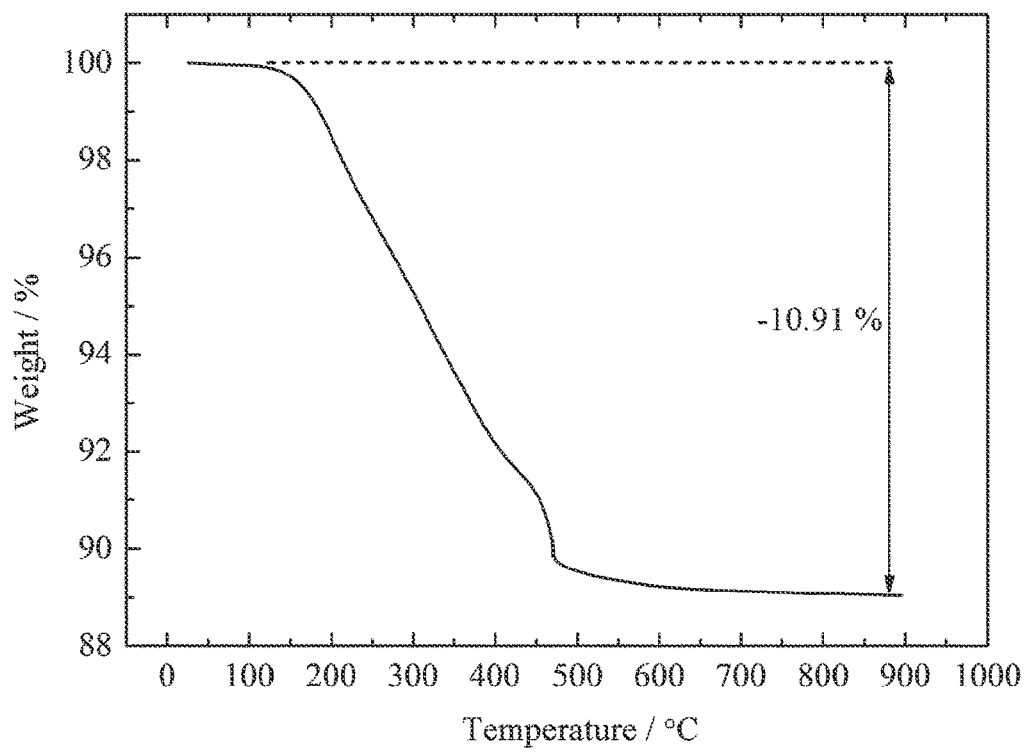
FIG. 18 is a graph showing a change in thermal weight of the complex oxide $H_7La_3Zr_2O_{12}$ obtained in Example 8.

Next, as in Example 1, the thermal analysis of the complex oxide was carried out. The TG curve is shown in FIG. 18. The weight reduction from 20° C. to 800° C. was 10.91 wt %. Assuming that the weight reduction is the same as in the case of Example 1, it was possible to calculate the chemical formula of the complex oxide as $H_7La_3Zr_2O_{12}$. In the synthesizing method of the example, it was confirmed that the whole lithium of the complex oxide is exchanged for hydrogen.

(Preparation of Molded Body and Electrolyte Film of Complex Oxide $H_7La_3Zr_2O_{12}$)

0.4 g of the complex oxide $H_7La_3Zr_2O_{12}$ synthesized above was pressurized by a uniaxial pressure molding method to obtain a pellet-like compact. The compact and 20 mL of ion exchange water were put into a PTFE beaker having an internal volume of 100 mL and the beaker was set in a SUS pressure resistant vessel. The SUS pressure resistant vessel was put into a dryer and held at a highest temperature of 180° C. for 24 hours. Thereafter, cooling was carried out and thus pellet-like solid electrolyte was obtained. As a result of calculating the relative density of the obtained solid electrolyte, the relative density was 78%. In addition, to 0.05 g of the complex oxide $H_7La_3Zr_2O_{12}$ powder synthesized above, a PTFE powder was mixed at a ratio of 4 wt %, and the mixture was pressurized by a uniaxial pressure molding method at 60 MPa to obtain a composite film of a thin film. The obtained composite film was a film-like dense molded body having a diameter of 10 mm, a thickness of 0.2 mm, and a mass of 0.0485 g.

Comparative Example 1

(Synthesis of Complex Oxide $Li_{6.25}H_{0.75}La_3Zr_2O_{12}$)

10 g of a raw material complex oxide $Li_7La_3Zr_2O_{12}$ (manufactured by Kojundo Chemical Lab. Co., Ltd.) powder and 500 mL of pure water were put into a glass beaker and stirred for 24 hours under the room temperature condition at 25° C. Thereafter, the resultant was washed with anhydrous ethanol and only a powder sample was taken out. Then, the sample was dried in air at 60° C. to collect the powder sample of the complex oxide.

The crystal structure of the obtained complex oxide was investigated by a powder X-ray diffraction device (trade name: SmartLab, manufactured by Rigaku Corporation). It was found that the complex oxide has good crystallinity and is a single phase of a garnet type structure belonging to the same tetragonal system as the raw material complex oxide. The quantitative analysis of the amount of lithium, the amount of lanthanum, and the amount of zirconium of the complex oxide was carried out using an ICP emission analyzer. On the assumption that lithium is exchanged for hydrogen, it was found that the complex oxide is $Li_{6.25}H_{0.75}La_3Zr_2O_{12}$. It was confirmed that lithium of the raw material complex oxide is rarely exchanged for hydrogen only with the washing treatment with water at room temperature described above.

Comparative Example 2

(Synthesis of Complex Oxide $Li_{7-x}H_xLa_3Zr_2O_{12}$ Using Pure Water Only)

1 g of the $Li_7La_3Zr_2O_{12}$ powder of Example 2 and 20 mL of pure water were put into a PTFE beaker having an internal volume of 100 mL and the beaker was set in a SUS pressure resistant vessel. The SUS pressure resistant vessel was put into a dryer and held at five kinds of highest temperatures (exchange temperatures) of 80° C., 100° C., 120° C., 140° C., and 180° C. for 24 hours. Thereafter, cooling was carried out, the resultant was washed with ethanol, and only the powder was taken out. Then, the powder was dried in air at 60° C. to collect the powder samples of each complex oxide.

Figure 19:
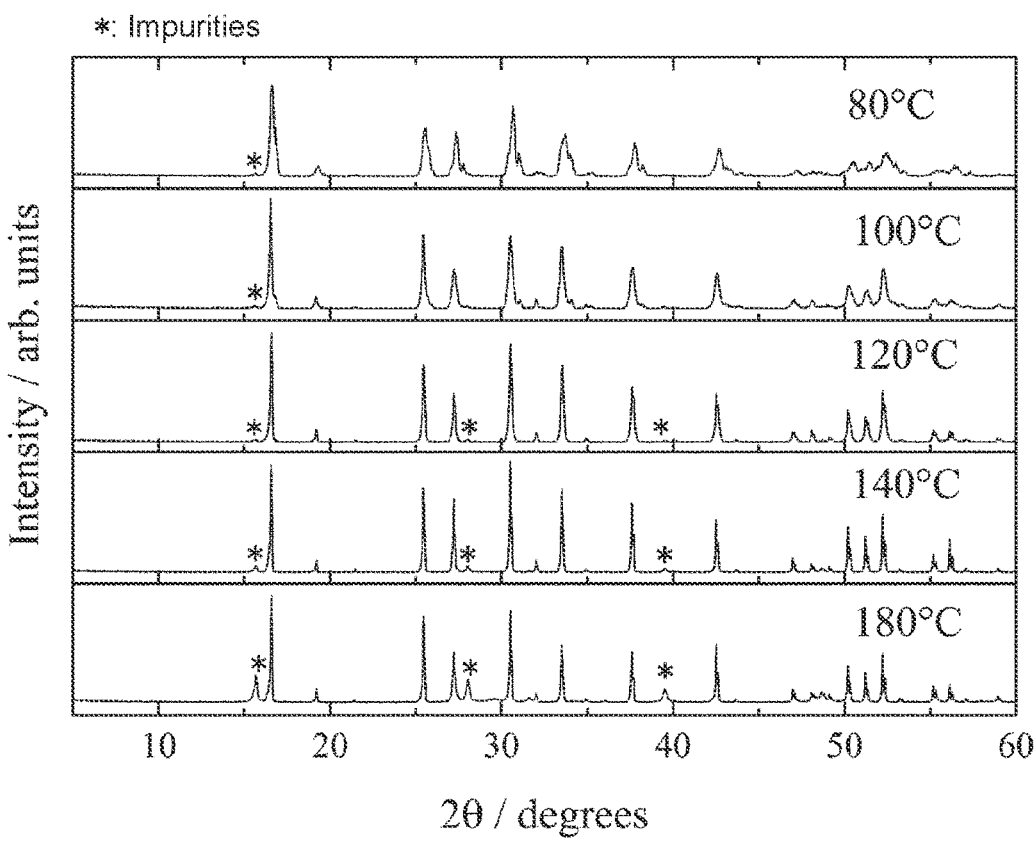
FIG. 19 is a powder X-ray diffraction chart of a complex oxide $Li_{7-x}H_xLa_3Zr_2O_{12}$ including lanthanum hydroxide of a decomposition product obtained in Comparative Example 2.

The crystal structure of each of the obtained complex oxides was investigated by a powder X-ray diffraction device (trade name: RINT-2550V, manufactured by Rigaku Corporation). It was confirmed that all of these complex oxides have a garnet type structure having good crystallinity as a main phase. The powder X-ray diffraction charts thereof are shown in FIG. 19. As shown in FIG. 19, in the chart of the complex oxides, compared to the chart of the raw material complex oxide (FIG. 6A), as the exchange temperature increases, tetragonal system peak separation does not occur and the crystal system is cubic.

In addition, it was confirmed that the crystal structure of each complex oxide is not a space group Ia-3d but a space group I-43d since apparent peaks are observed near 22° and 53°. However, it was confirmed that impurity phase peaks were observed near 16°, 28°, and 39°, and particularly, the peak at 16° corresponds to lanthanum hydroxide. In a case where the exchange temperature is 180° C., it was determined that the intensity of these impurity peaks becomes stronger and the decomposition reaction of the complex oxides is advanced.

Figure 20:
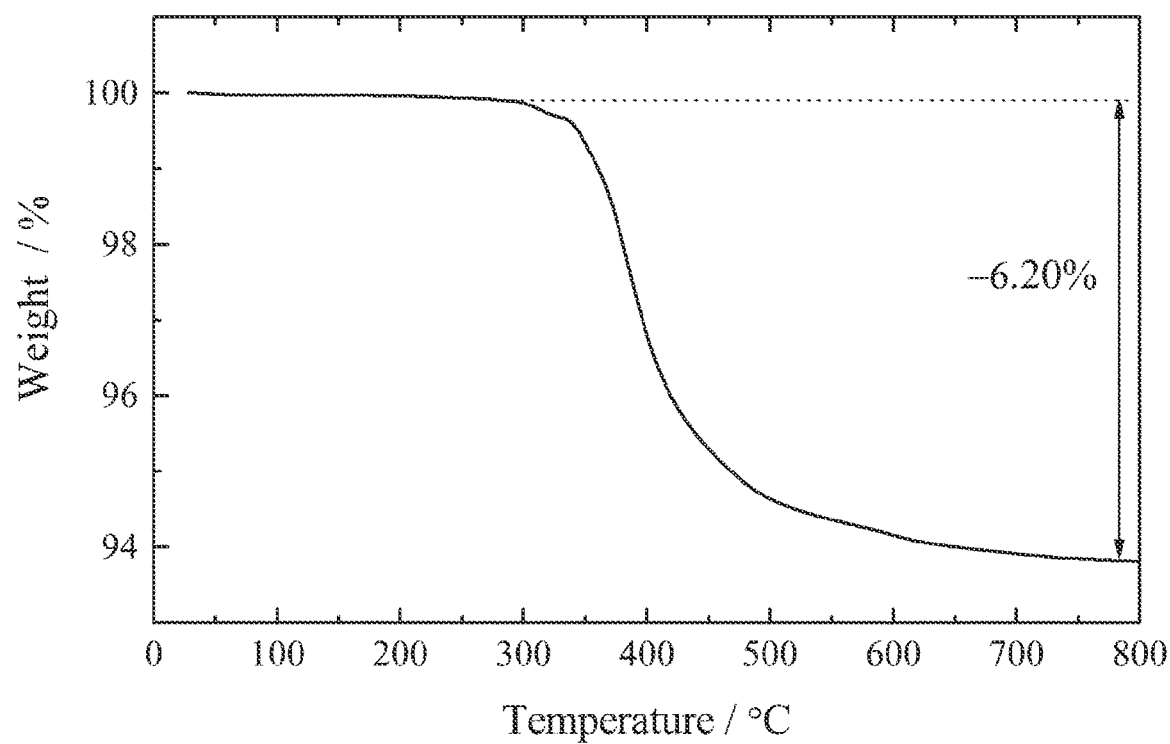
FIG. 20 is a graph showing a change in thermal weight of a complex oxide $Li_{1.50}H_{5.50}La_3Zr_2O_{12}$ obtained at an exchange temperature of 120° C. in Comparative Example 2.

Next, as in Example 1, the thermal analysis of the complex oxide was carried out at an exchange temperature of 120° C. The TG curve is shown in FIG. 20. The weight reduction from 20° C. to 800° C. was 6.20 wt %. Assuming that the weight reduction is the same as in the case of Example 1, it was possible to calculate the chemical formula of the complex oxide as $Li_{1.50}H_{5.50}La_3Zr_2O_{12}$. In the synthesizing method of the comparative example, it was confirmed that while the exchange reaction between lithium included in the raw material complex oxide and hydrogen is advanced, lanthanum hydroxide as an impurity is included in the complex oxide. In a case of using the complex oxide as a solid electrolyte, lanthanum hydroxide included in the complex oxide becomes lanthanum carbonate and the strength of the complex oxide as an electrolyte material cannot be maintained. Therefore, the synthesizing method of the comparative example is not suitable.

INDUSTRIAL APPLICABILITY

The complex oxide of the present invention can be suitably used as an electrolyte material in a fuel cell of an intermediate temperature operation type fuel cell system or the like.

REFERENCE SIGNS LIST

1: cylindrical solid oxide fuel cell
2: fuel electrode
3: interconnector
4: electrolyte
5: air electrode

What is claimed is:

1. A complex oxide that is represented by a chemical formula $Li_{7-x}H_xLa_3M_2O_{12}$ (M represents Zr and/or Hf, and $3.2 < x \leq 6.6$) and is a single phase of a garnet type structure belonging to a cubic system,
    wherein a cubic system lattice constant a satisfies $13.07\ \text{Å} < a < 13.11\ \text{Å}$.

2. The complex oxide according to claim 1, wherein a crystal structure thereof is a space group I-43d.

3. A complex oxide that is represented by a chemical formula $Li_{7-x}H_xLa_3M_2O_{12}$ (M represents Zr and/or Hf, and $6.6 < x \leq 7$) and is a single phase of a garnet type structure belonging to a cubic system,
    wherein a cubic system lattice constant a satisfies $13.07\ \text{Å} < a < 13.11\ \text{Å}$.

4. The complex oxide according to claim 3, wherein a crystal structure thereof is a space group Ia-3d.

5. A proton conductor comprising:
    the complex oxide according to claim 1.

6. A fuel cell comprising:
    a fuel electrode;
    an air electrode; and
    a solid electrolyte containing the proton conductor according to claim 5.

7. A method for producing a complex oxide that is represented by a chemical formula $Li_{7-x}H_xLa_3M_2O_{12}$ (M represents Zr and/or Hf, and $3.2 < x \leq 7$) and is a single phase of a garnet type structure belonging to a cubic system, the method comprising:
    an exchange step of bringing a raw material complex oxide represented by a chemical formula $Li_{7-x}H_xLa_3M_2O_{12}$ (M represents Zr and/or Hf, and $0 < x \leq 3.2$) and a compound having a hydroxy group or a carboxyl group into contact with each other to exchange at least some of lithium of the raw material complex oxide and hydrogen of the compound having a hydroxy group or a carboxyl group,
    wherein a cubic system lattice constant a satisfies $13.07\ \text{Å} < a < 13.11\ \text{Å}$.

8. The method for producing a complex oxide according to claim 7,
    wherein the compound having a hydroxy group or a carboxyl group is included in an acidic aqueous solution or is alcohol.

9. The method for producing a complex oxide according to claim 7,
    wherein in the exchange step, the raw material complex oxide and the compound having a hydroxy group or a carboxyl group are brought into contact with each other at a temperature of 80° C. to 220° C.

10. The method for producing a complex oxide according to claim 7,
    wherein in the exchange step, the raw material complex oxide and the compound having a hydroxy group or a carboxyl group are brought into contact with each other for 12 hours or longer.

* * * * *